United States Patent [19]
Hoshina et al.

[11] Patent Number: 5,931,954
[45] Date of Patent: Aug. 3, 1999

[54] I/O CONTROL APPARATUS HAVING CHECK RECOVERY FUNCTION

[75] Inventors: Satoshi Hoshina; Takeshi Sakuma; Hiroshi Sakai, all of Tokyo, Japan

[73] Assignee: Kabushiki Kaisha Toshiba, Kawasaki, Japan

[21] Appl. No.: 08/782,077

[22] Filed: Jan. 13, 1997

[30] Foreign Application Priority Data

Jan. 31, 1996 [JP] Japan ................................. 8-015352

[51] Int. Cl.$^6$ ................................................ G06F 11/00
[52] U.S. Cl. ................................................ 714/15
[58] Field of Search ........................... 395/182.13, 181, 395/180; 364/285.2, 230.2, 267, 267.8

[56] References Cited

U.S. PATENT DOCUMENTS

| | | | |
|---|---|---|---|
| 3,688,274 | 8/1972 | Cormier et al. | 340/172.5 |
| 3,736,566 | 5/1973 | Anderson et al. | 340/172.5 |
| 4,740,969 | 4/1988 | Fremont | 371/12 |
| 5,293,613 | 3/1994 | Hayden et al. | 395/575 |
| 5,438,675 | 8/1995 | Fujioka | 395/182.07 |
| 5,664,090 | 9/1997 | Seki et al. | 395/182.13 |
| 5,712,971 | 1/1998 | Stanfill et al. | 395/183.1 |
| 5,751,939 | 5/1998 | Stiffler | 395/182.13 |
| 5,832,283 | 11/1998 | Chou et al. | 395/750.01 |

OTHER PUBLICATIONS

Philip A. Bernstein, "Sequoia: A Fault–Tolerant Tightly Coupled Multiprocessor for Transaction Processing", IEEE Computer, vol. 21, No. 2, Feb. 1988, pp. 37–45.

C. Kubiak et al., "Penelope: A Recovery Mechanism For Transient Hardware Failures and Software Errors," FTCS 12th Annual International Symposium: Fault Tolerant Computing, Jun. 22–24, 1982, pp. 127–133.

J.G. Earle et al., "Multiprocessing Checkpoint Retry," IBM Technical Disclosure Bulletin, vol. 14, No. 2, Jul. 1971, pp. 358–361.

*Primary Examiner*—Robert W. Beausoliel, Jr.
*Assistant Examiner*—Stephen C. Elmore
*Attorney, Agent, or Firm*—Finnegan, Henderson, Farabow, Garrett & Dunner, L.L.P.

[57] ABSTRACT

In a computer system, when a CPU performs a state setting operation, such as setting an appropriate operation mode for I/O devices, the log data of the state setting operation is stored in a log storage area. Upon occurrence of a fault in the computer system, the I/O devices are cleared, and the state setting operation of the I/O devices is performed on the basis of the log data of the prior state setting operation stored in the log storage area. Therefore, the states of the I/O devices can be recovered to a state at a checkpoint when the process is restarted.

32 Claims, 18 Drawing Sheets

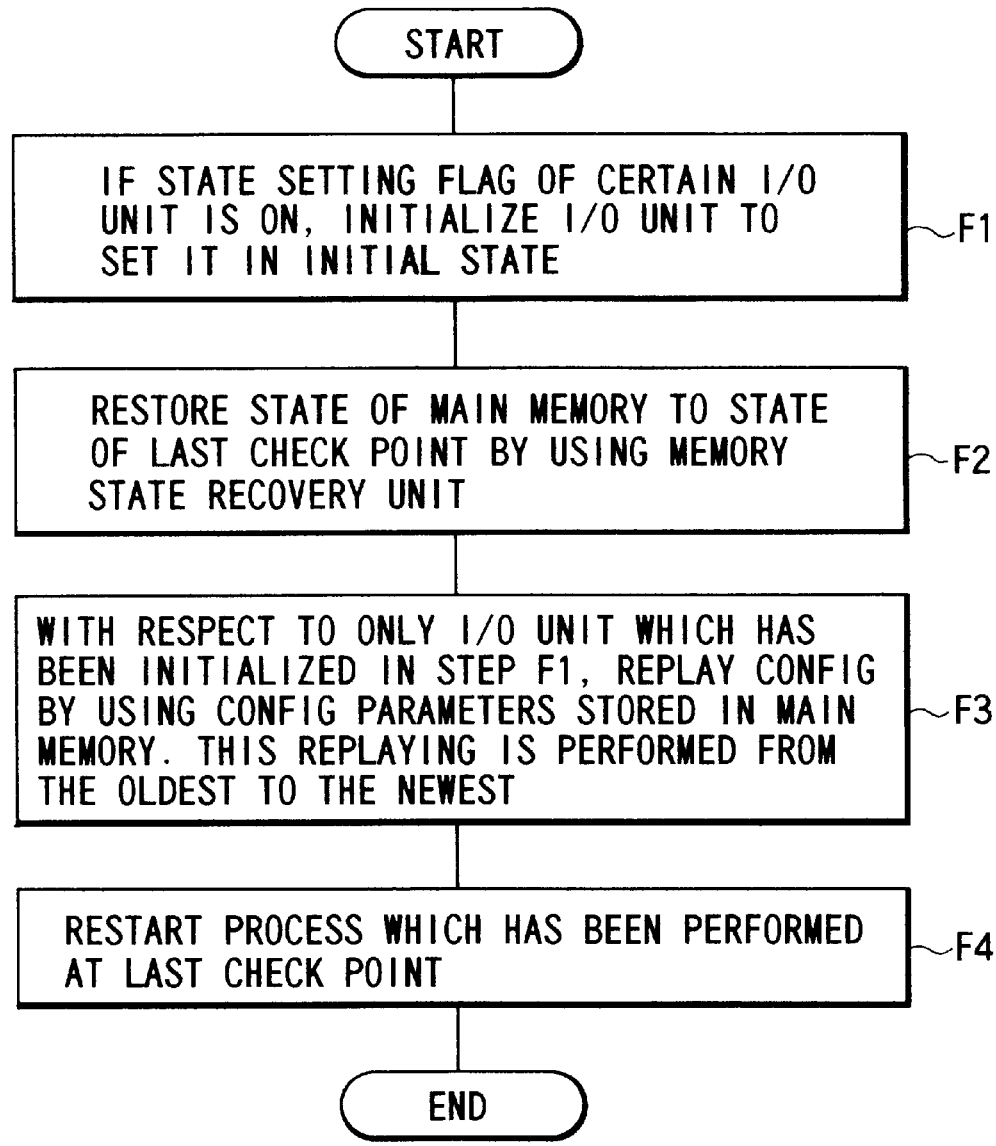
F I G. 10

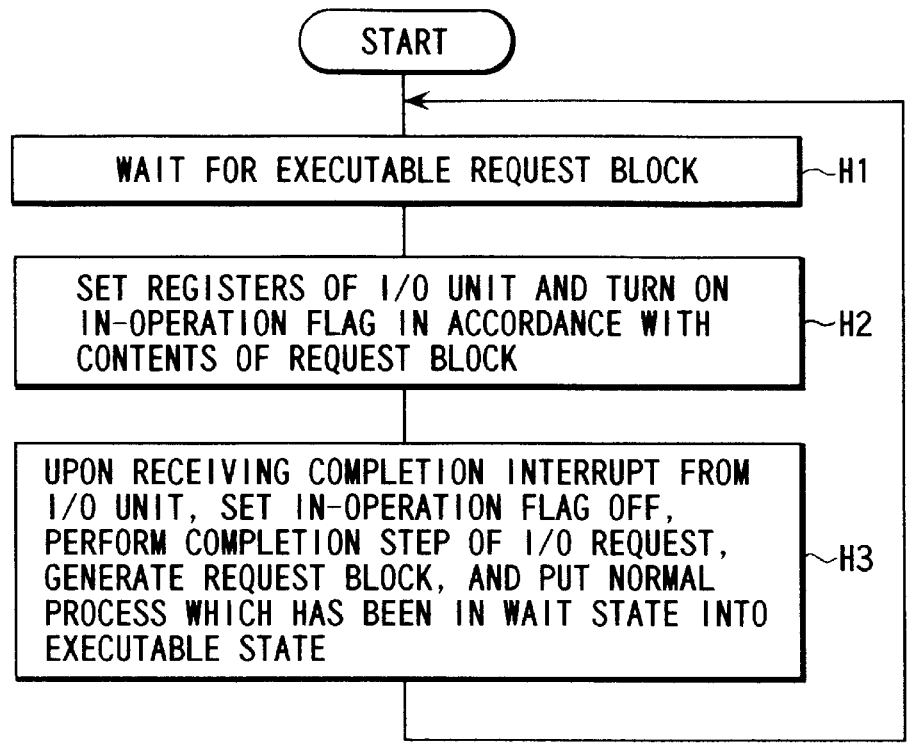
F I G. 12
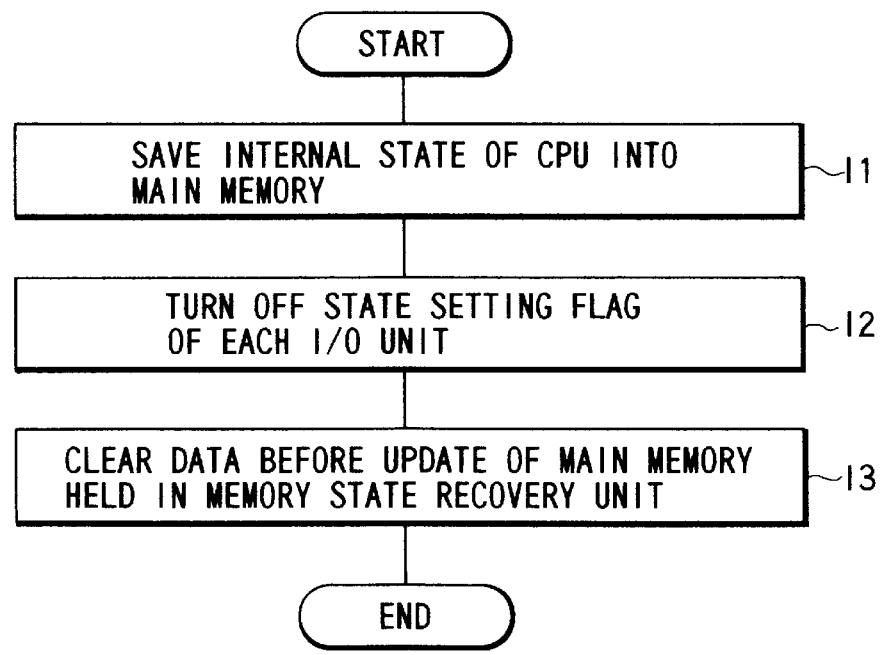
F I G. 14

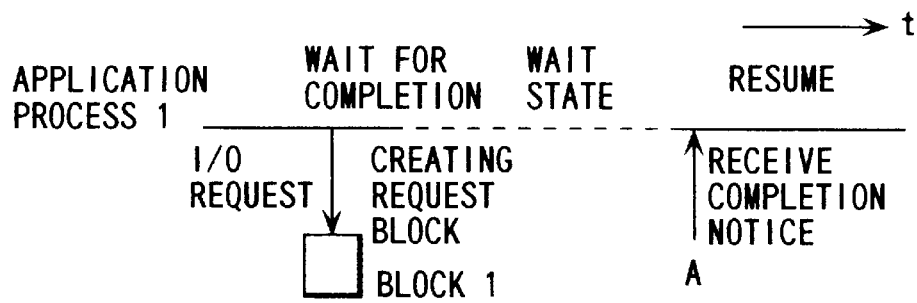
F I G. 13 A
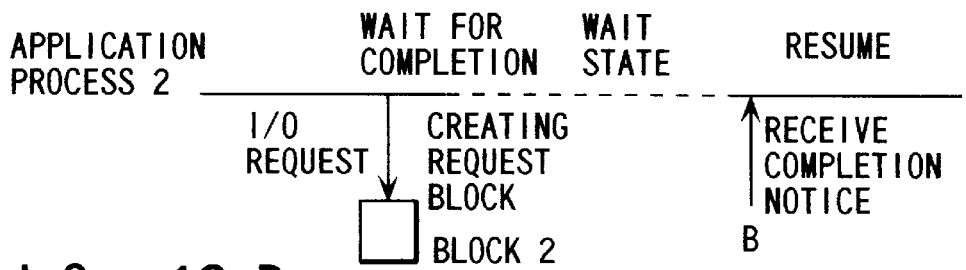
F I G. 13 B
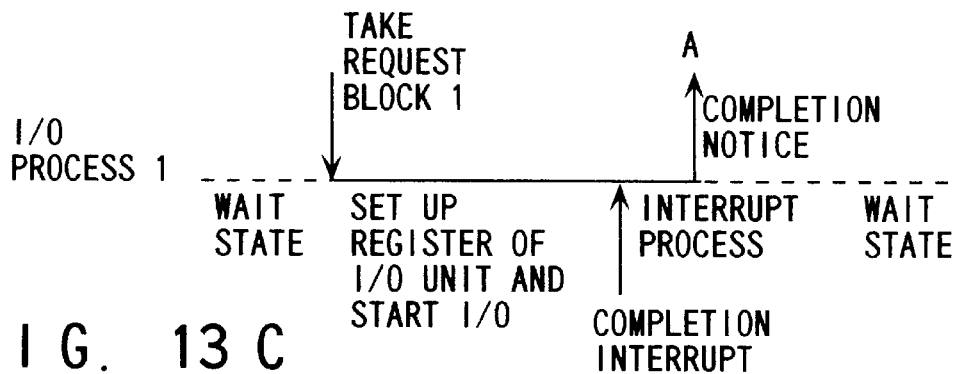
F I G. 13 C
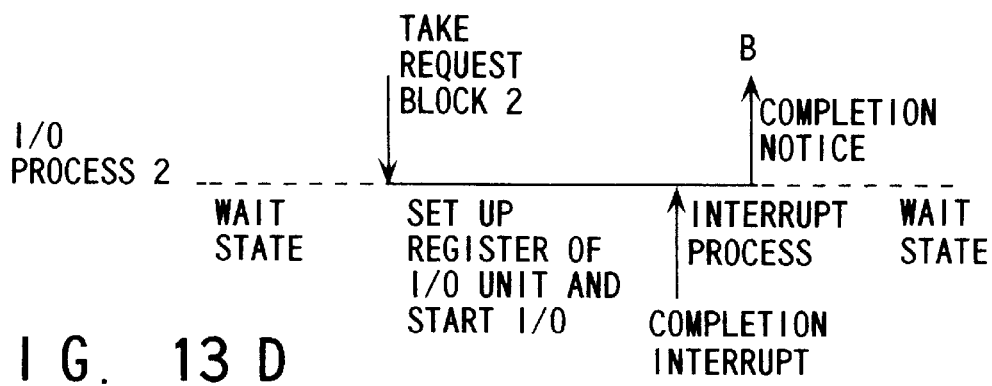
F I G. 13 D

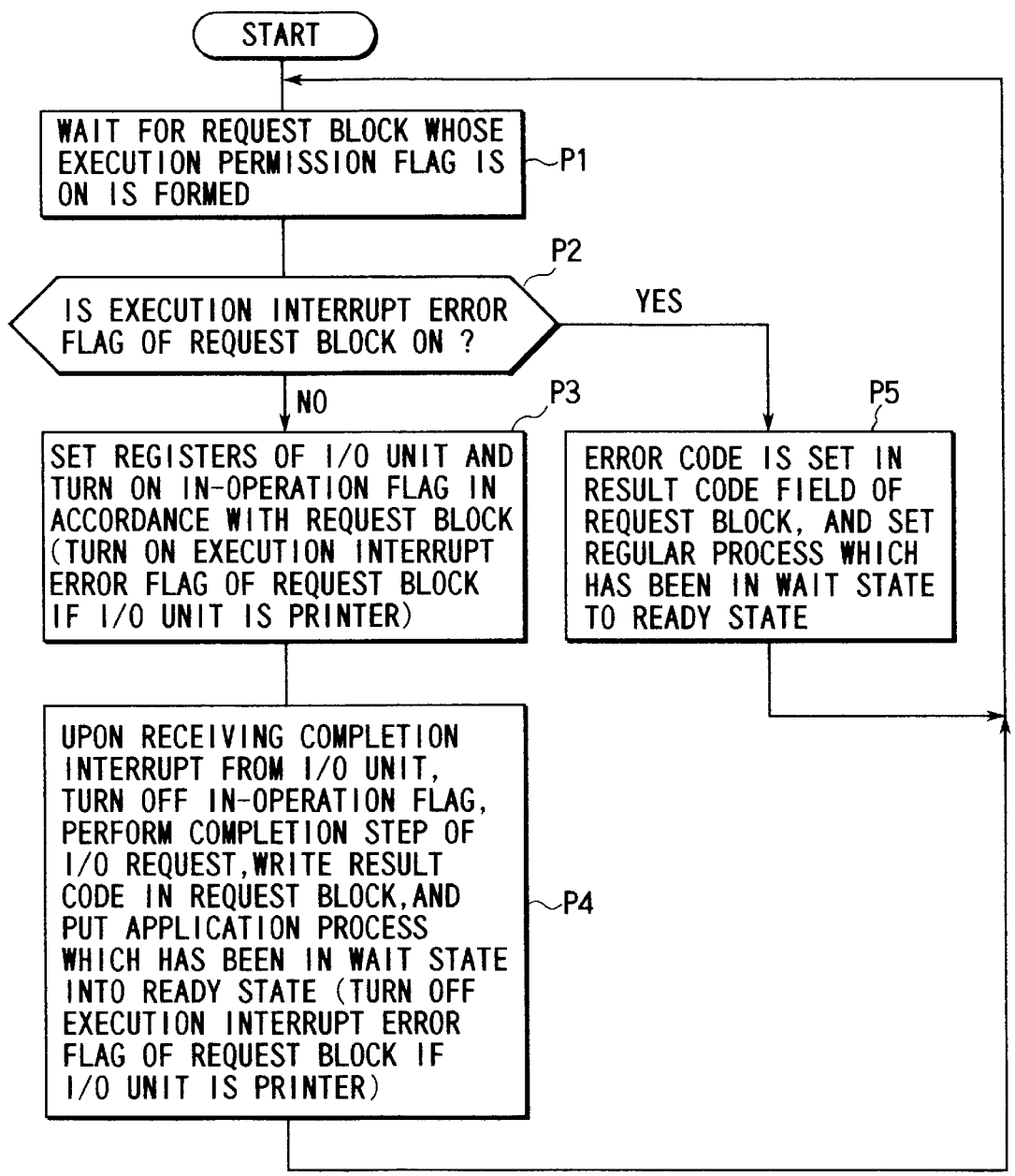
F I G. 22

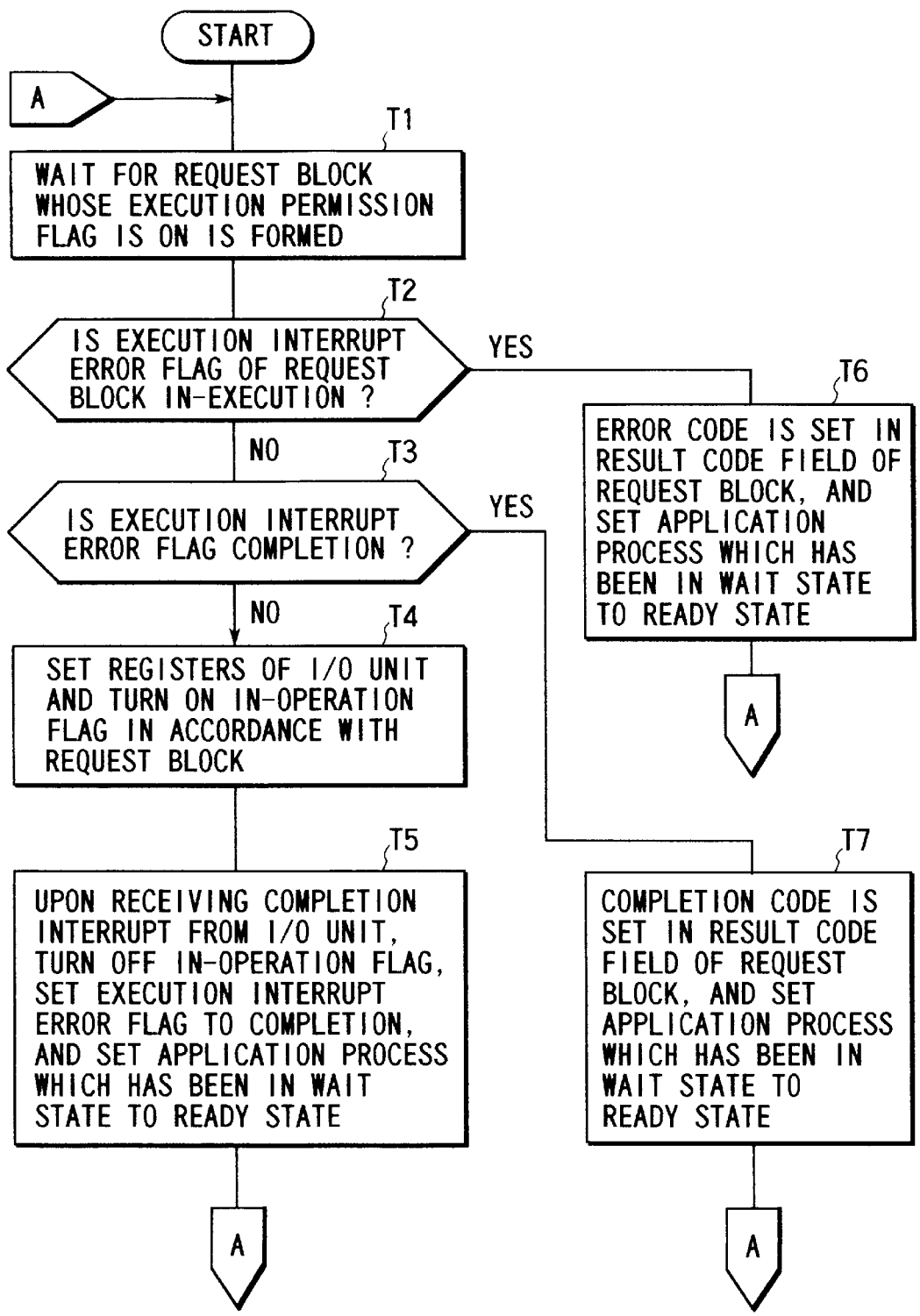
F I G. 26

I/O CONTROL APPARATUS HAVING CHECK RECOVERY FUNCTION

BACKGROUND OF THE INVENTION

The present invention relates to an I/O control apparatus adapted to a computer system having check point recovery function.

In recent years, computer systems have considerably improved. With this improvement, reliability, such as coping with a fault, has become mandatory. One method implemented in a fault tolerant computer is a checkpoint recovery scheme.

According to a method for implementing a checkpoint recovery scheme, the internal state of a CPU, namely, the contents of the registers and the cache memory of a CPU are periodically saved in a main memory to acquire a checkpoint on the main memory. When data processing cannot continue due to a fault in the computer system, the main memory is restored to the state of the most recent checkpoint, and data processing is restarted using the internal state of the CPU stored in the main memory.

A method for restoring the main memory to the state of the checkpoint is as follows. In an update operation of a main memory, the address and data to be updated are stored in a memory state recovery unit. Upon occurrence of a fault in the computer system, the main memory is written back with the data previously stored in the memory state recovery unit.

In this checkpoint recovery scheme, upon occurrence of a fault in the computer system, the internal state of the main memory or CPU can be restored to the state of the most recent checkpoint by using the memory state recovery unit. An I/O device connected to the computer system, however, cannot be easily restored to the state of the most recent checkpoint.

This problem will be described below with reference to FIGS. 1 and 2.

As shown in FIG. 1, in this computer system, a CPU 51 requests a disk controller 52 to access a disk 53 to perform an I/O operation. FIG. 2 shows a timing diagram of the I/O processing of the computer system having the above arrangement.

As depicted in FIG. 2, registers of the disk controller 52 are set to read data from a predetermined position of the disk 53 at times T0 to T1 ((1) in FIG. 2), and the disk controller 52 is started at time T1 ((2) in FIG. 2). In this manner, the disk controller 52 and the disk 53 execute a read operation at times T1 to T2 ((3) in FIG. 2). The read data are transferred into the main memory 54 by DMA transfer from the disk controller 52.

The CPU 51 receives a completion interrupt from the disk controller 52 at time T2 ((4) in FIG. 2), thereby performing a completion interrupt processing to the disk controller 52 at times T2 to T3 ((5) and (6) in FIG. 2). Another post processing with respect to the read operation is performed at time T3 to T4 ((7) in FIG. 2).

The first problem in this case is that a checkpoint acquired at an arbitrary time is not always valid.

For example, assume that a checkpoint is acquired in the middle of setting the registers of the disk controller 52 (the setup sequence between times T0 and T1.)

In this case, upon occurrence of a fault of the computer, a latter part of the setup sequence is re-performed from the most recent checkpoint, namely only a part of the registers of the disk controller 52 are set again. For this reason, the disk controller 52 does not always operate desirably.

In consideration of the characteristics of the disk controller 52, not only at times T0 to T1 described above, but also at times T0 to T3, i.e., when the CPU 51 acquires a checkpoint during a setup sequence for an I/O operation such as a read/write operation, the disk controller 52 does not always operate desirably when a latter part of the setup sequence is re-performed from the checkpoint after a fault occurs in the system.

One method to solve this problem is that a checkpoint operation must not be performed during a setup sequence of an I/O device. However, in a computer system in which many I/O devices are incorporated, the CPU almost always performs setup sequence of an I/O operation. Therefore, it may lead to a considerable performance degradation to prevent a checkpoint operation during a setup sequence of an I/O device.

A second problem is as follows. Assume a fault occurs in the system during a DMA transfer from the disk controller 52 to the main memory 54. In this case, ongoing DMA transfer must be stopped before the main memory 54 is restored to the state of the most recent checkpoint.

In a conventional computer system, in order to stop ongoing DMA transfer, it is necessary to initialize (reset) the I/O device. Since the I/O device is set in an initial state by initializing the I/O device, a special process is required to restore the I/O device to the state of the most recent checkpoint.

As a scheme for solving the problem of I/O processing in the above checkpoint recovery scheme, the following two schemes are known.

The first scheme is disclosed in USP-4740969 "METHOD AND APPARATUS FOR RECOVERING FROM HARDWARE FAULTS". In normal data processing, the data of read/write operations of the registers of an I/O device, during an interrupt from the I/O device, are recorded in a log memory. When a register setup sequence is restarted from the most recent checkpoint after a fault occurs in the computer system, the read/write operations performed to the registers of the I/O device before the fault occurs are re-performed as follows. For a write operation, the data is discarded and not written to the registers of the I/O device. For a read operation, instead of reading out from the register of the I/O device, the data in the log memory is returned to the CPU. For an interrupt from the I/O device, the interrupt is generated and sent to the CPU at the same time as in the preceding execution.

This scheme requires a special interface circuit which is not provided to an ordinary computer system. Moreover, it is difficult to apply this scheme to a multi-processor system.

The second scheme is disclosed in SEQUOIA: A Fault-tolerant Tightly Coupled Multiprocessor for Transaction Processing, IEEE Computer, February 1988. In this scheme, data processing in computer system is divided into a data processing portion which can be performed by using only CPU and a main memory and an I/O processing portion which handles I/O devices. These portions are executed by different computers.

FIG. 3 shows the schematic arrangement of a computer system in which data processing in the computer system is divided into a portion, performed by only access to a main memory and a portion including access to the I/O device, and the former is executed by a computer 100 whose reliability is improved by the checkpoint recovery scheme, and the latter is executed by a computer 200 which does not use the checkpoint recovery scheme. In the logical interface between these portions, a request representing "read the designated amount of data at the designated position of the designated disk " is sent from the computer 100 to the computer 200. When the computer 200 actually has read the data, a termination code indicating whether the operation is normally completed or not and the data read from the disk are returned from the computer 200 to the computer 100.

To improve the reliability of the computer 200, the constituent elements of the computer 200 are duplicated. Namely, the computer 200 consists of computer main bodies 210a and 210b and I/O devices 220a and 220b. In a normal state, the request is simultaneously processed on both sides, and the execution results are compared with each other to check whether the execution results are identical. If a fault occurs on one side, the requested operation is continuously performed on the remaining side.

This scheme has the following disadvantage. That is, since at least two types of computers must be prepared, the computer system is large and costly.

The following idea would arise from the second scheme. That is, the computer 100 and the computer 200 may be implemented by one computer by using virtual computer technology. However, this idea does not work well because of the following reason.

The scheme disclosed in SEQUOIA is based on the following assumption. Since the independent computers 100 and 200 are used, even if the data processing of the computer 100 is restarted from a checkpoint due to occurrence of a fault within the computer 100, the I/O processing of computer 200 is not influenced by the fault.

However, if the computer 100 and the computer 200 were implemented on one computer by using virtual computer technology, the computer 100 and the computer 200 would be simultaneously influenced by a fault occurring in the base computer system.

As described above, a checkpoint recovery computer system needs a special treatment of the I/O processing portion. A method of arranging a special interface between the CPU and the I/O device, or a method of separately performing a calculating portion and an I/O processing portion on two independent computers are employed. Therefore, the cost is considerably increased.

BRIEF SUMMARY OF THE INVENTION

It is an object of the present invention to provide an I/O control apparatus capable of controlling an I/O device on one computer having a checkpoint recovery function without requiring a special interface circuit or requiring two independent computers.

Another object is to provide a software layer between an operating system kernel and an existing device driver which restores the state of the I/O devices when the computer system rolls back upon a fault.

According to the present invention, an I/O control apparatus in a computer system which has one or more CPUs, a main memory, and one or more I/O devices and in which the CPUs periodically save the internal state of the CPUs and the contents of the main memory as a checkpoint, and the internal state of the CPUs and the contents of the main memory of the most recent checkpoint are restored when a fault occurs in the computer system to restart data processing. The I/O control apparatus includes an I/O device state storing section for logging parameters of state setup sequence of the I/O devices performed by the CPUs. The state storing section includes a section for erasing part of the existing logged parameters of an I/O device which is made unnecessary when a new state of the I/O device is set. The I/O control apparatus also includes an I/O device state restoring section for restoring the state of the I/O devices to that of the most recent checkpoint by first initializing the I/O devices and second reexecuting a state setup sequence according to the logged parameters stored by the I/O device state storing section.

According to this invention, when a state setup operation, such as operation mode setup, is performed by the CPU to an I/O device, the log data of the state setup operation is stored in, e.g., a main memory. Upon occurrence of a fault in the computer system, an I/O device is initialized by an initialize command or a reset signal assertion, and then the state setup sequence is reexecuted for the I/O device according to the log data, so that the state of the I/O device is restored to the state of the most recent checkpoint.

It is often the case that a part of the log data becomes unnecessary because of a new state setup operation and therefore the unnecessary part can be eliminated. For example, assume that an I/O device which has an initial state of "state A" is set to "state B", and next set to "state C", and then a checkpoint is acquired. In this case, upon the setting up of "state C", the log data for "state B " becomes unnecessary and can be eliminated. And upon the checkpoint acquisition, all the log data other than that relating to "state C " setting up becomes unnecessary and can be eliminated. Therefore, a section for eliminating the unnecessary part of the log data is provided, whereby the area required for the log data can be saved. In addition, the time required for reexecuting the state setup sequence after the I/O device initialization can be reduced.

For an I/O device to which a new state setup operation has not been performed since the preceding checkpoint, initializing the I/O device and reexecuting the state setup sequence need not be performed upon occurrence of a fault. For this reason, a section for skipping the initialization and state setup sequence of such an I/O device is arranged. The time required for recovery can be further shortened.

This invention further comprises a request block creating section for creating, when an application process in the computer system makes an I/O request, a request block in the main memory which contains information necessary to perform the I/O request; I/O execution processes for performing I/O operations by accessing the I/O devices according to request blocks; and an I/O execution process initializing section for initializing, upon restart from the most recent checkpoint which follows a fault occurrence, the ongoing I/O execution processes and causing the I/O operations being performed by the I/O execution processes to be performed again from the beginning.

According to the present invention, when an application process makes an I/O request, a request block which contains information necessary for the I/O operation is created and executed by an I/O execution process. The application process moves to a wait state until the end of the I/O operation.

Assume a fault occurs in the computer system during the I/O operation. While the state of the computer system rolls back to the most recent check point, an I/O device state restoring section restores the state of the I/O device. Upon restarting from the most recent checkpoint, the I/O execution process initializing section initializes the I/O execution process responsible for the I/O operation, and causes the I/O operation performed halfway to be performed again from the beginning. In the restart phase, an I/O execution process simply performs the I/O operation according to the request block.

The fact that an I/O operation is performed by an I/O execution process, not by the application process itself enables the I/O operation to be restarted from the beginning. If the application process did the I/O operation as in a conventional way, it would be difficult or impossible to restart the I/O operation from the beginning. It should be noted that at the most recent checkpoint, the I/O operation is being performed halfway.

Of the request blocks stored in the main memory, request blocks which were created before the most recent checkpoint should be processed by I/O execution processes, and the execution of request blocks which were created after the most recent checkpoint should be postponed until the next checkpoint.

Generally, if a rollback occurs, the second data processing from the most recent checkpoint is not always the same as the first data processing because of the real time clock and asynchronous events (i.e. external interrupt). Therefore, an I/O request made by data processing before fault occurrence may not be made or may be made differently by the second data processing after the fault recovery. Therefore, it is necessary to postpone the execution of request blocks created after the most recent checkpoint until a new checkpoint is acquired.

When a checkpoint has been acquired, many request blocks become executable. Therefore it is efficient to allocate, upon a checkpoint acquisition, many CPUs to I/O execution processes so that I/O operations are performed with small delay.

Assuring that the CPU which has executed the application process which requires an I/O operation also performs the I/O execution process which is responsible for the I/O operation, leads to an increase in cache hit ratio.

To determine the number of CPUs allocated to I/O execution processes properly, depending on the number of request blocks to be processed, improves the system performance.

Assume that while an I/O execution process is executing a device driver routine which outputs a character string to a printer unit, a fault occurs in the computer system. Then, only a part of the characters may be printed out on the paper and cannot be erased. In this case, the application process which made the I/O request should receive an error reply so that the application process may do an error recovery at the application level, like a printer jam error.

Assume that an I/O execution process completes the execution of a device driver routine which outputs a character string to a printer unit and then a fault occurs in the computer system. In this case, the whole character string has been printed out. If the request block was executed again after the fault recovery, it would result in duplicated print. Therefore, it is desirable that the application process which made the I/O request receives a successful I/O completion reply without re-executing the I/O request, when a fault occurs in the computer system if the I/O request is an output request and has been completed before the fault occurs.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings serve to explain the principles of the invention, in which

FIG. 10 is a flow diagram of a fault recovery in the first embodiment;

FIG. 12 is a flow diagram of an I/O execution process in the second embodiment;

FIGS. 13A through 13D show how I/O operations are performed by application process and I/O execution process in the second embodiment;

FIG. 14 is a flow diagram of a checkpoint acquisition in the second embodiment;

FIG. 22 is a flow diagram of an I/O execution process in the third embodiment;

FIG. 26 is a flow diagram of an I/O execution process in the third embodiment.

DETAILED DESCRIPTION OF THE INVENTION

Embodiments of the present invention will be described below with reference to the accompanying drawings.

First Embodiment

Figure 1:
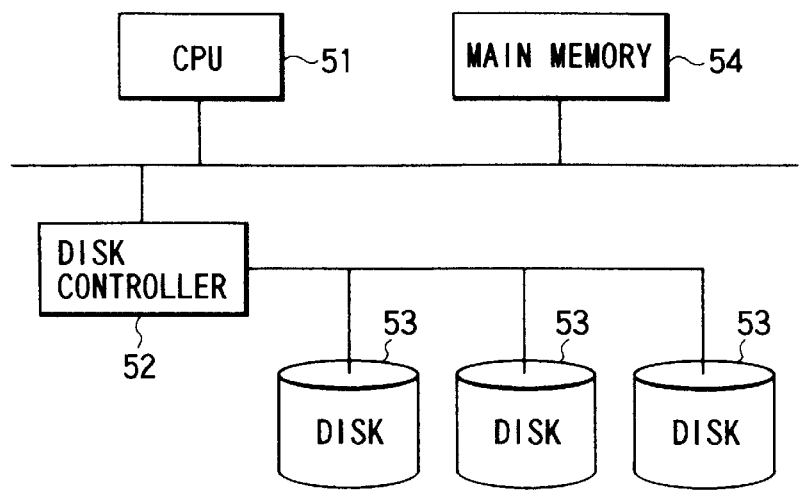
FIG. 1 is a view showing the arrangement of a computer system using a conventional checkpoint restart scheme.
Figure 2:
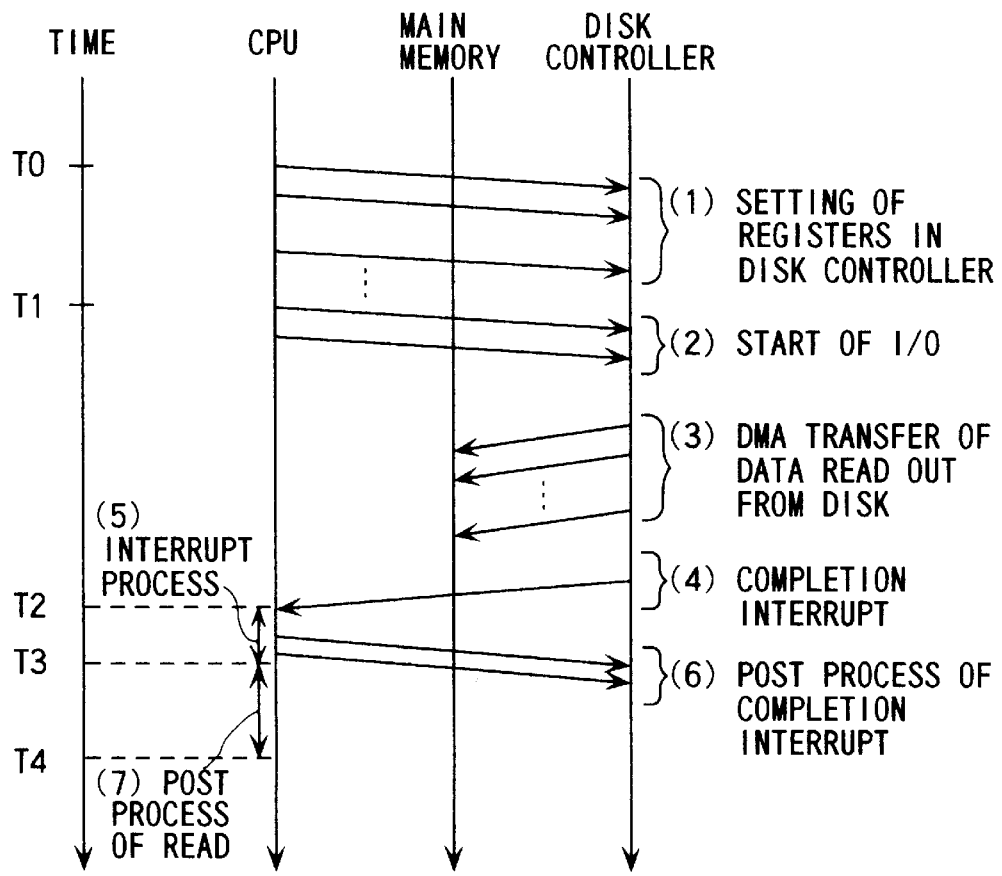
FIG. 2 is a timing chart in an I/O process of the computer system shown in FIG. 1.
Figure 3:
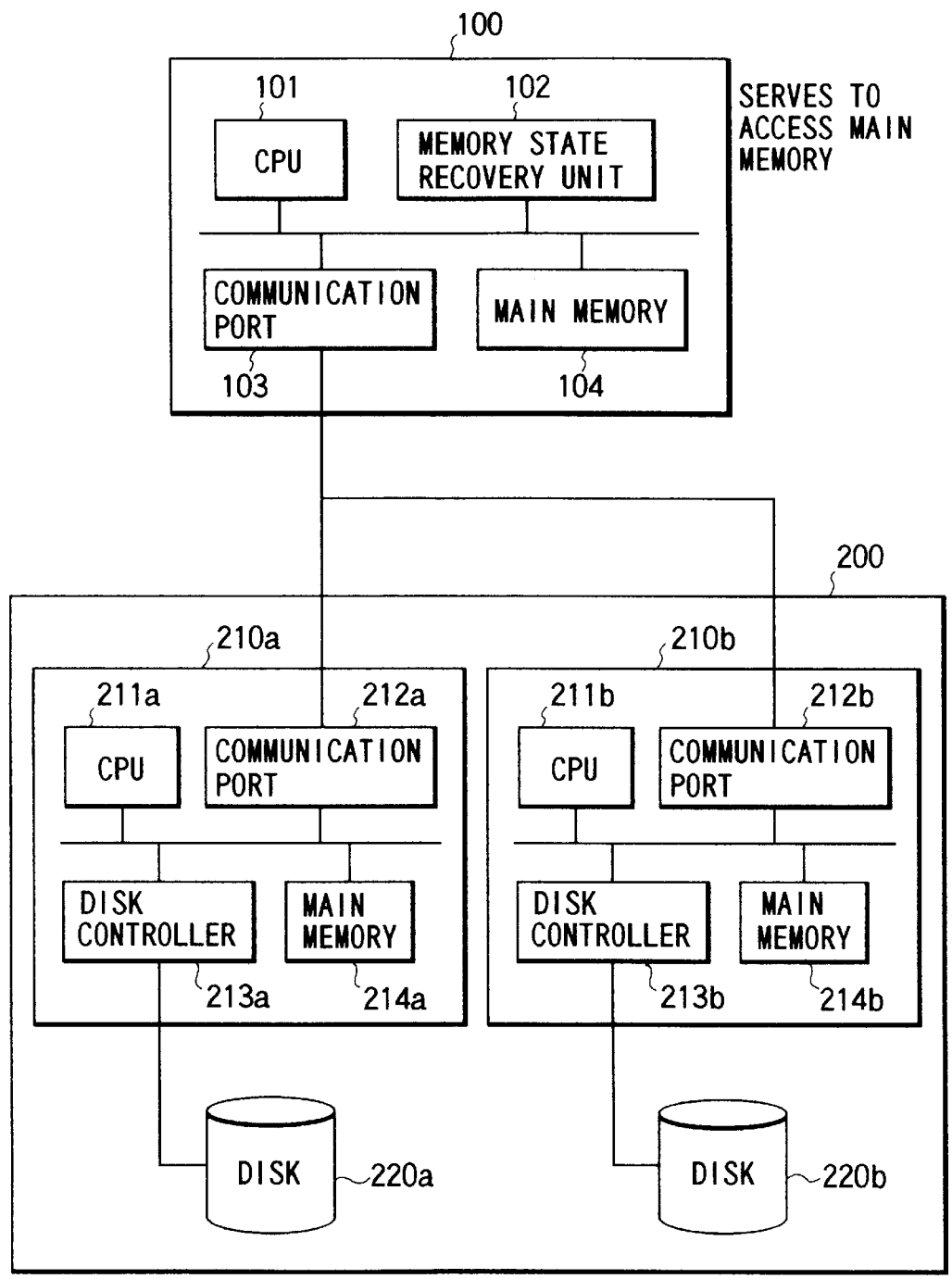
FIG. 3 is a view showing an arrangement in which I/O control is implemented by a computer system using a conventional checkpoint restart scheme.
Figure 4:
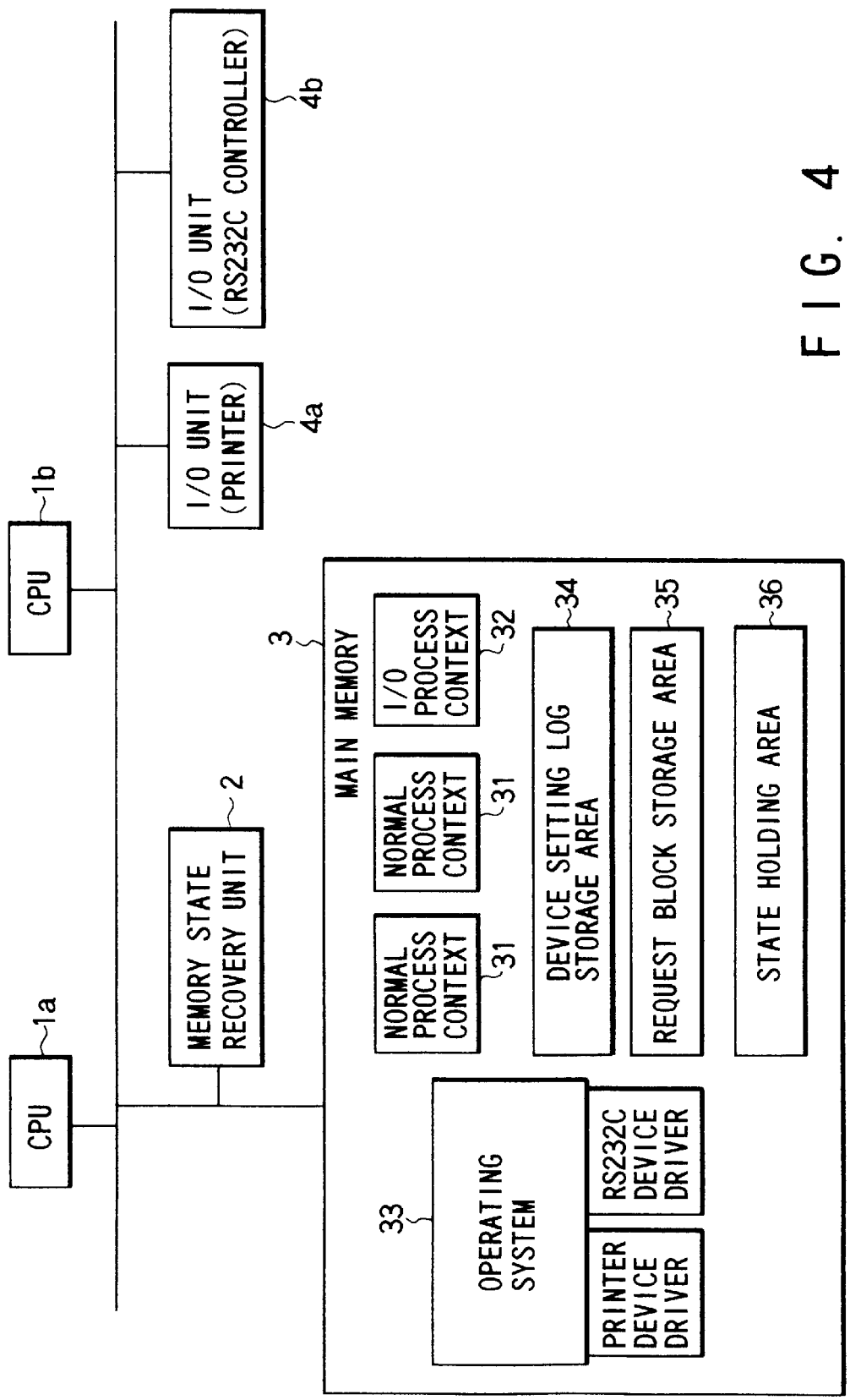
FIG. 4 is a schematic view showing the arrangement of a computer system according to the first embodiment of the present invention.

The first embodiment of the present invention will be described below with reference to FIG. 4. FIG. 4 is a schematic view showing a computer system according to the first embodiment.

As shown in FIG. 4, the computer system of this embodiment comprises CPUs 1a and 1b, a memory state recovery unit 2, a main memory 3, and I/O devices 4a and 4b such as a printer and an RS232C controller.

When the content of the main memory 3 is updated by the CPUs 1a or 1b, the memory state recovery unit 2 holds the "before" image to restore the contents of the main memory 3. A detail of a memory state recovery unit 2 is described in C. Kubiak et al., PENELOPE: A RECOVERY MECHANISM FOR TRANSIENT HARDWARE FAILURES AND SOFTWARE ERRORS, FTCS, 1982. The context of an application process including a stack area and data area is stored in the main memory 3 as context information 31. Here, an application process means a process of a conventional computer system.

The operating system 33, more specifically the printer device driver and RS232C device driver sets up the operation mode such as a baud rate, a stop bit, a parity, and the like when the system is initialized or an application process requests it. The set up operation mode is stored in a state setting storage area 34 as log data.

For example, in a typical UNIX operating system, a state set up sequence for an I/O device, such as an RS232C controller, is performed by a device driver routine named configuration (xxconfig), the interface of which is common to all the device drivers. Therefore, the parameters of the configuration routine are preferably stored in the state setting storage area 34 of the main memory 3 at the beginning of the configuration routine, and the parameters of the configuration routine can be recorded in the same way independent of the I/O device type.

Figure 5:
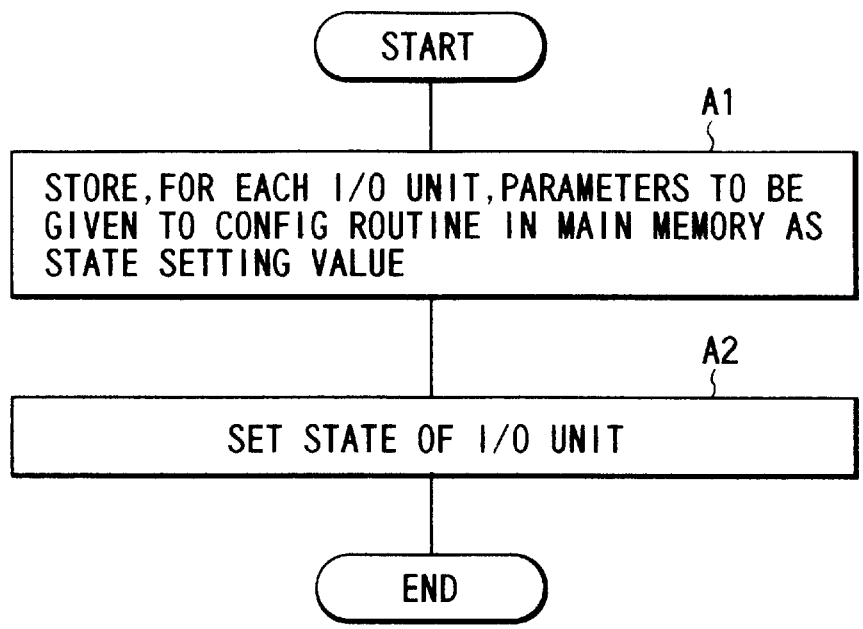
FIG. 5 is a flow diagram of a configuration routine in the first embodiment.

FIG. 5 shows a flow diagram of a configuration routine for each I/O device.

(1) Store parameters of the configuration routine in the main memory as a state setting up value (step A1).

(2) Set up the state of the I/O device (step A2).

Figure 6:
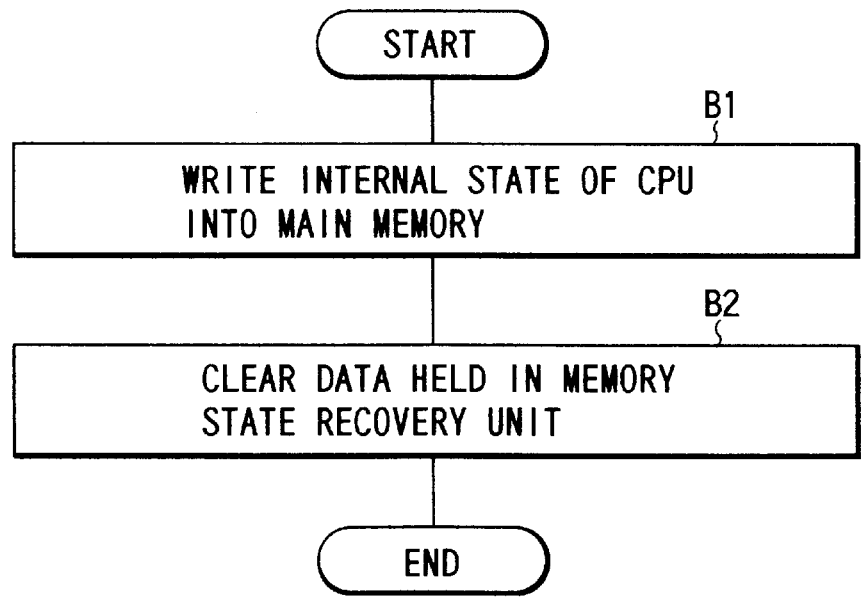
FIG. 6 is a flow diagram of a checkpoint acquisition in the first embodiment.

FIG. 6 shows a flow diagram of a checkpoint acquisition.

(1) Save the internal state of the CPU (i.e., the contents of registers and the cached data) into the main memory (step B1).

(2) Clear data held in the main memory recovery unit (step B2).

Figure 7:
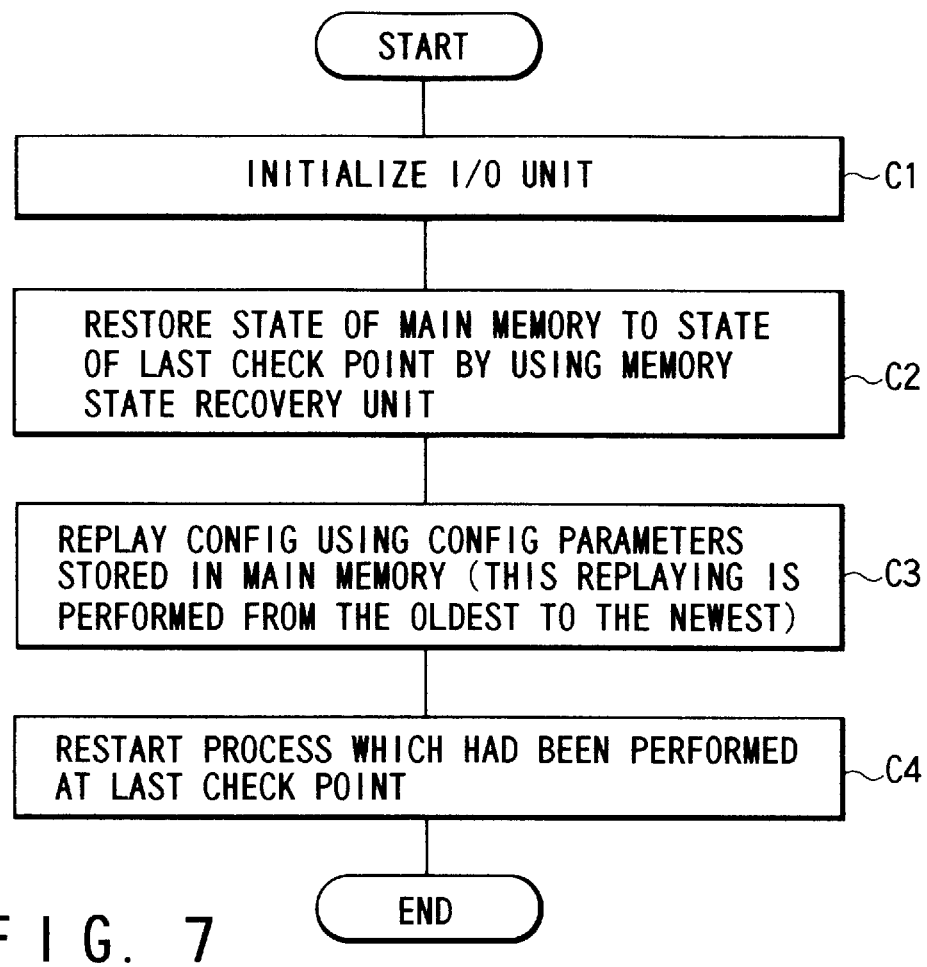
FIG. 7 is a flow diagram of a fault recovery in the first embodiment.

FIG. 7 shows a flow diagram when the set up sequence is reexecuted from the most recent checkpoint upon occurrence of a fault.

(1) Initialize the I/O device by a reset command or reset signal assertion (step C1).

(2) Restore the state of the main memory to the state of the most recent checkpoint by using the memory state recovery unit (step C2). As a result, the log of state setting up operations to the I/O device is restored to the state of the most recent checkpoint.

(3) Execute the configuration routine again using the configuration parameters stored in the main memory (step C3). This re-execution is performed from the oldest to the newest. As a result, the state of the I/O device is recovered to the state of the checkpoint.

(4) Restart data processing which was being performed at the checkpoint (step C4).

Therefore, data processing is restarted in a state such that the state of each I/O device is restored to the state of the checkpoint. This means that the checkpoint recovery mechanism and I/O device restoring mechanism are realized in a single computer.

For a RS232C controller, when operation modes such as a baud rate, a stop bit, and a parity are newly set, the old setting up values become unnecessary. Therefore, it is sufficient that only the latest values of the operation modes of the RS232C controller 4b are held in the state setting storage area 34 of the main memory 3 (unnecessary log data is discarded). Then, the fault recovery time becomes reduced.

A state holding area 36 is effectively arranged in the main memory 3 to manage the state setting up flags of the I/O devices 4a and 4b. The state setting up flags are managed in the following manner. The state setting up flag ON indicates that some state setting up sequence has been performed or is being performed to the I/O device since the most recent checkpoint, and the state setting up flag OFF indicates that no state setting operation has been performed to the I/O device since the most recent checkpoint.

Figure 8:
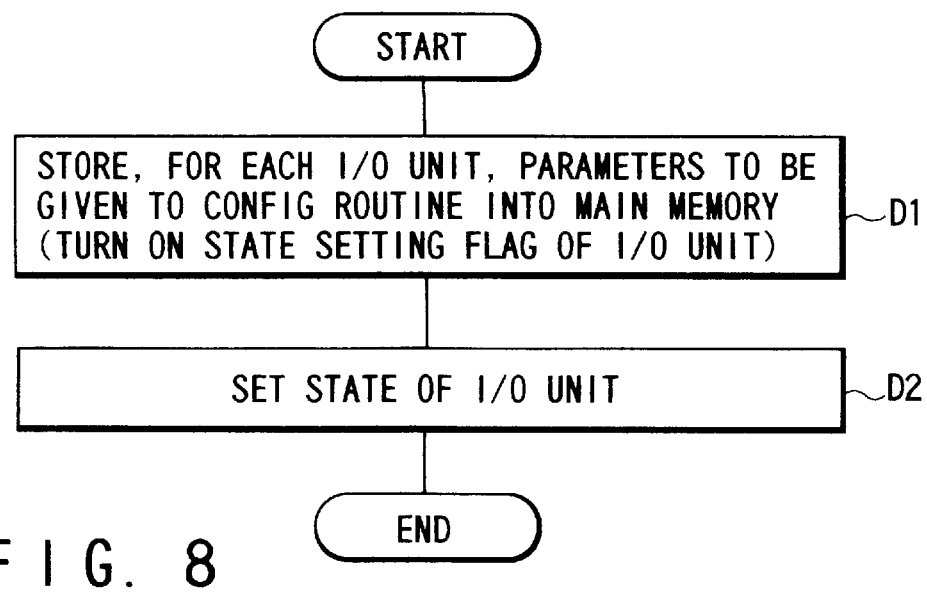
FIG. 8 is A flow diagram of a configuration routine in the first embodiment.

FIG. 8 shows a flow diagram of a configuration routine in the case that the above state setting up flags are employed.

(1) Store, parameters of the configuration routine into the main memory (step D1). Turn on the state setting up flag of the I/O device.

(2) Set up the state of the I/O device (step D2).

Figure 9:
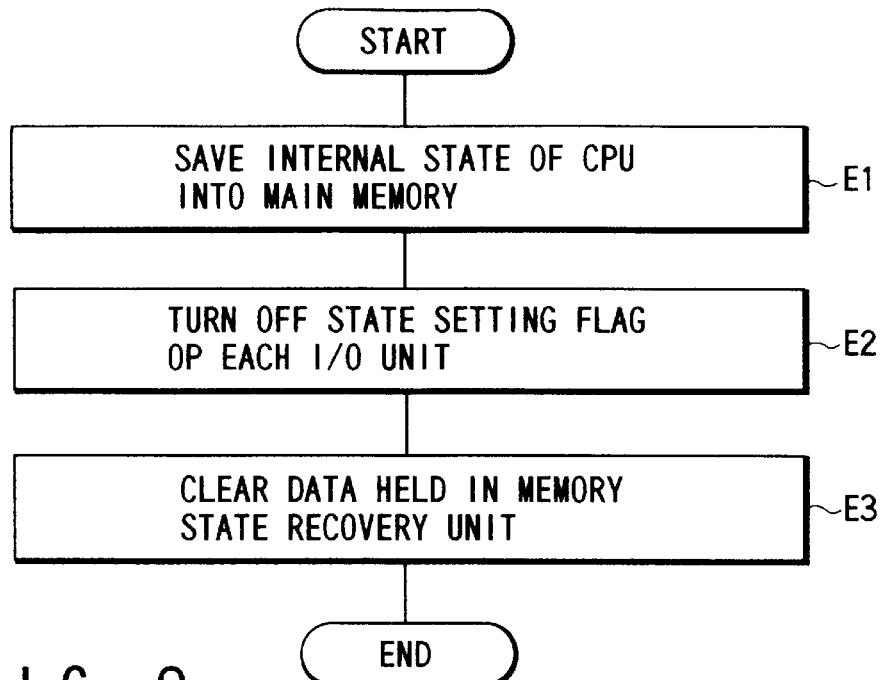
FIG. 9 is a flow diagram of a checkpoint acquisition in the first embodiment.

FIG. 9 shows a flow diagram of a checkpoint acquisition in this case.

(1) Save the internal state of the CPU into the main memory (step E1).

(2) Turn off the state setting up flag of each I/O device (step E2).

(3) Clear data held in the memory state recovery unit (step E3).

FIG. 10 shows a flow diagram for fault recovery in this case.

(1) If the state setting-up flag of a certain I/O device is ON, initialize the I/O device since it implies that a new state has been set up since the most recent checkpoint (step F1). On the other hand, an I/O device with state setting up flag OFF does not need to be initialized.

(2) Restore the state of the main memory to the state of the most recent checkpoint by using the memory state recovery unit (step F2). As a result, the log of the state setting up operations to the I/O device is recovered to the state of the most recent checkpoint.

(3) With respect to only an I/O device which has been initialized in step F1, execute the configuration routine again using the configuration parameters stored in the main memory (step F3). This re-execution is performed from the oldest to the newest. As a result, the state of the I/O device is recovered to the state of the most recent checkpoint.

(4) Restart data processing which was being performed at the most recent checkpoint (step F4).

In this manner, the fault recovery can skip initializing an I/O device with the recovery setting up flag OFF, which results in faster fault recovery.

Second Embodiment

It is assumed that a computer system according to this embodiment comprises, in addition to the arrangement of the computer system described in the first embodiment, an arrangement having a request block storage area 35 and I/O execution processes (FIG. 4).

In this embodiment, when an application process makes a system call to request an I/O operation from an I/O device, the operating system, instead of calling the device driver routine in the context of the caller process, calls a request block create routine. The request block create routine creates a request block having the entry address of the device driver routine and the parameters. Here, the application (caller) process moves to a wait state. The request block is simply held in the main memory until a new checkpoint is acquired. Therefore, if there are a lot of application processes in the computer system, the number of the request blocks held in the main memory would increase in time.

There are a certain number of I/O execution processes in the system. An I/O execution process is a special process to execute device driver routines according to a request block.

When a new checkpoint has been acquired, the request blocks become ready to be processed. An I/O execution process with an initial state is allocated to one of the request blocks. The I/O execution process executes the device driver routine with the appropriate parameters both of which are designated by the request block. Therefore, the number of I/O operations being performed concurrently depends on the number of I/O execution processes. The I/O execution process moves into a wait state when it invokes the I/O device within the designated device driver routine. When the I/O device returns a termination interrupt, the interrupt handling routine of the device driver is called and the result is reflected to the I/O execution process context. Then, the I/O execution process becomes ready. At the end of the I/O operation, the I/O execution process reports the result to the application process via the request block.

If a fault occurs in the computer system during a DMA transfer from an I/O device to the main memory, it is necessary to stop the DMA transfer by initializing the I/O device before the main memory is restored. For this purpose, an in-operation flag is employed for each I/O device with DMA capability in order to determine whether each I/O device must be initialized. An in-operation flag is controlled to be ON only while the corresponding I/O device performs the DMA transfer.

Figure 11:
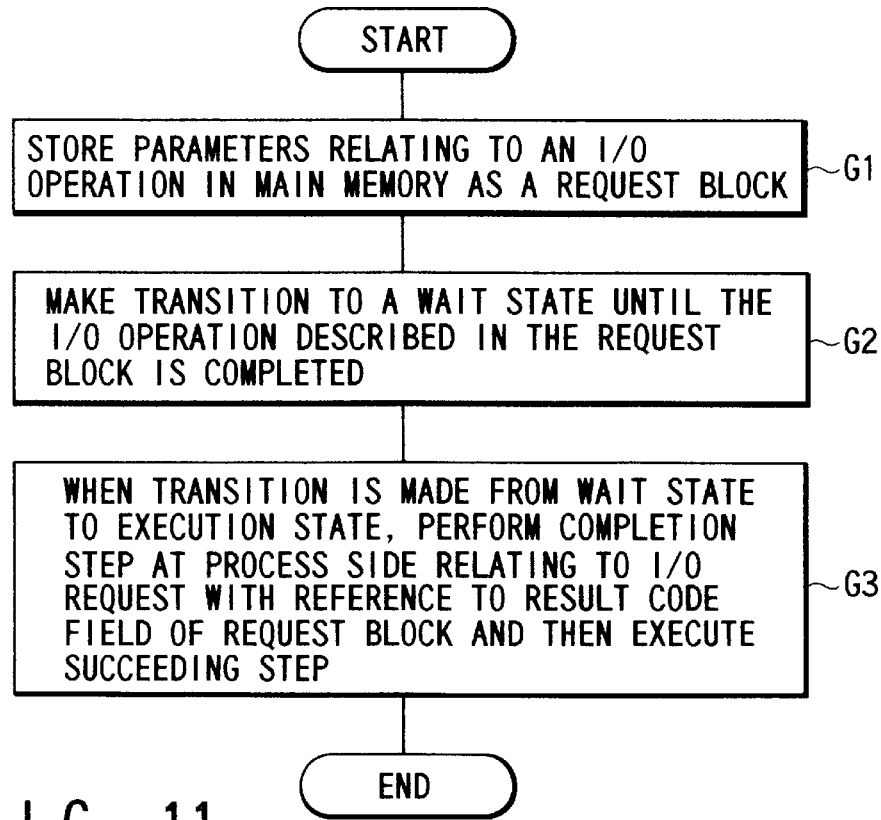
FIG. 11 is a flow diagram of an application process which makes an I/O request in the second embodiment of the present invention.

FIG. 11 shows an I/O request flow diagram performed by an application process in this embodiment.

(1) Store parameters relating to an I/O operation in the main memory as a request block (step G1).

(2) Make transition to a wait state until the I/O operation described in the request block is completed (step G2).

(3) When the application process resumes its execution, perform a completion step at the application process side relating to the I/O request with reference to a result code field of the request block and then execute a succeeding step (step G3).

FIG. 12 shows a flow diagram of an I/O execution process. Here, it is assumed that a multiplicity of I/O execution processes are executed concurrently.

(1) Wait for an executable request block (initial state, step H1).

(2) Set up registers of the I/O device and turn on the in-operation flag in accordance with the request block, thereby starting the I/O device (step H2)

(3) Upon receiving completion interrupt from the I/O device, turn off the in-operation flag, perform a completion step of the I/O request, write result code in the request block, and put the application process which has been in wait state into ready state (step H3).

FIGS. 13A through 13D show a sample sequence of I/O operations performed by two application processes and two I/O execution processes.

When an I/O request is made by an application process, a corresponding request block is created and store d in the memory. (FIGS. 13A and 13B) After the request block is created, an I/O execution process (register setting up, starting, and completion interrupt processing of the I/O device) is executed under the I/O execution process context (FIGS. 13C and 13D).

FIG. 14 shows a flow diagram of checkpoint acquisition in this embodiment.

(1) Save the internal state of the CPU into the main memory (step I1).

(2) Turn off the state setting up flag of each I/O device (step I2).

(3) Clear data held in the memory state recovery unit (step I3).

Figure 15:
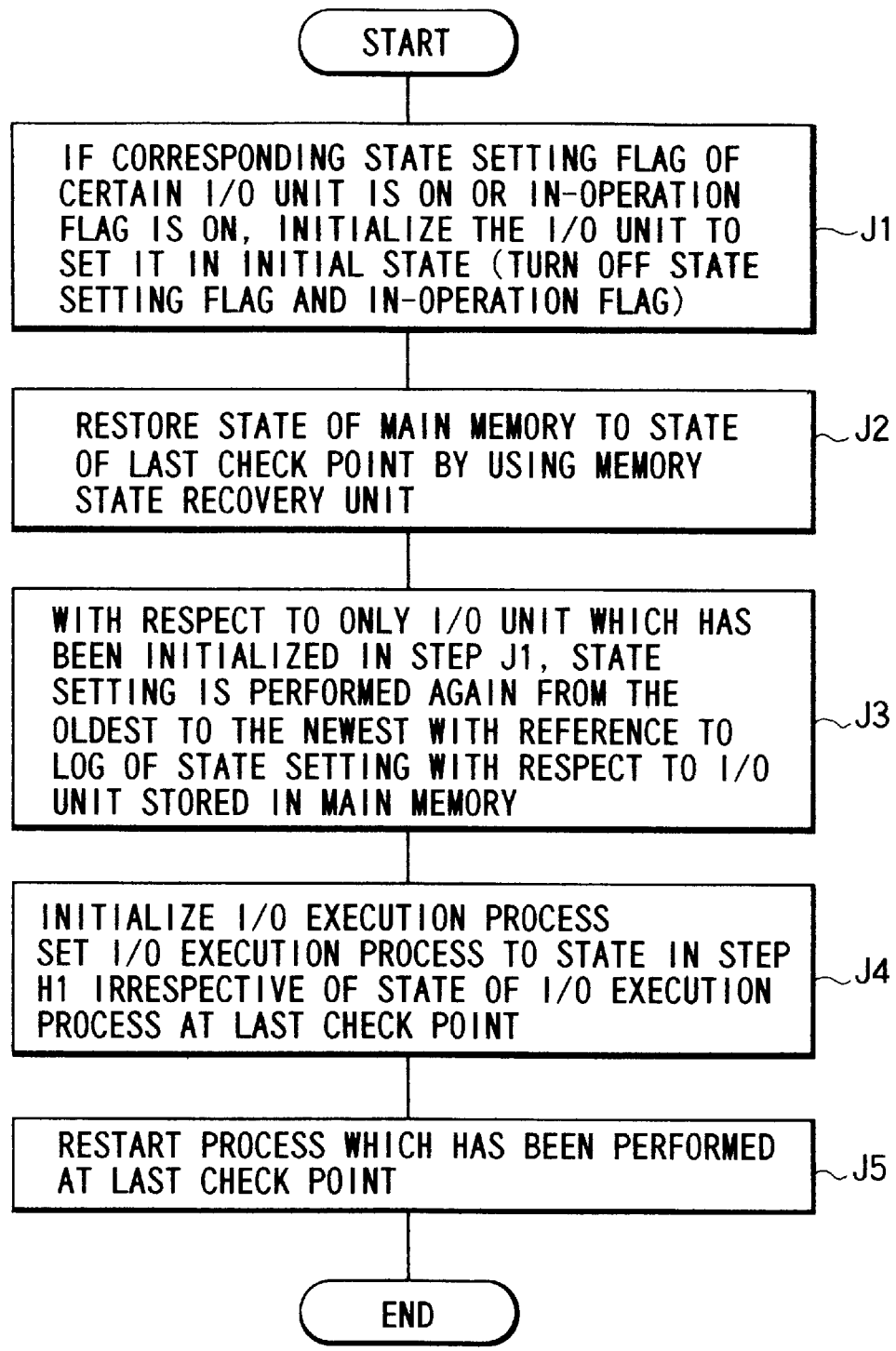
FIG. 15 is a flow diagram of a fault recovery in the second embodiment.

FIG. 15 shows a flow diagram of fault recovery upon occurrence of a fault in this embodiment.

(1) If the corresponding state setting up flag of a certain I/O device is ON or the in-operation flag is ON, initialize the I/O device. Turn off the state setting up flag and the in-operation flag (step J1).

(2) Restore the state of the main memory to the state of the most recent checkpoint by using the memory state recovery unit (step J2).

(3) For only the I/O devices which have been initialized at step J1, reexecute the state set up sequence from the oldest to the newest with reference to the log of the state setting up values held in the main memory (step J3). In this manner, the state of the I/O device is recovered to the state of the most recent checkpoint.

(4) Initialize I/O execution processes. More specifically, the I/O execution processes are set to step H1 irrespective of the state of the I/O execution process at the most recent checkpoint (step J4).

(5) Restart data processing which was being performed at the most recent checkpoint (step J5).

It is important that control of an I/O device is performed in the context of an I/O execution process, which is different from an application process. Initialization at step J4 can be performed without any influence on the application process which requested the I/O operation. In the prior art, since an I/O operation is performed in the application process context, the above initialization would need a complicated or ad hoc process.

It is effective to add an execution permission flag to each request block. This execution permission flag is controlled such that the execution permission flag remains OFF until a new checkpoint is acquired, and is turned ON when a new checkpoint has been acquired.

Figure 16:
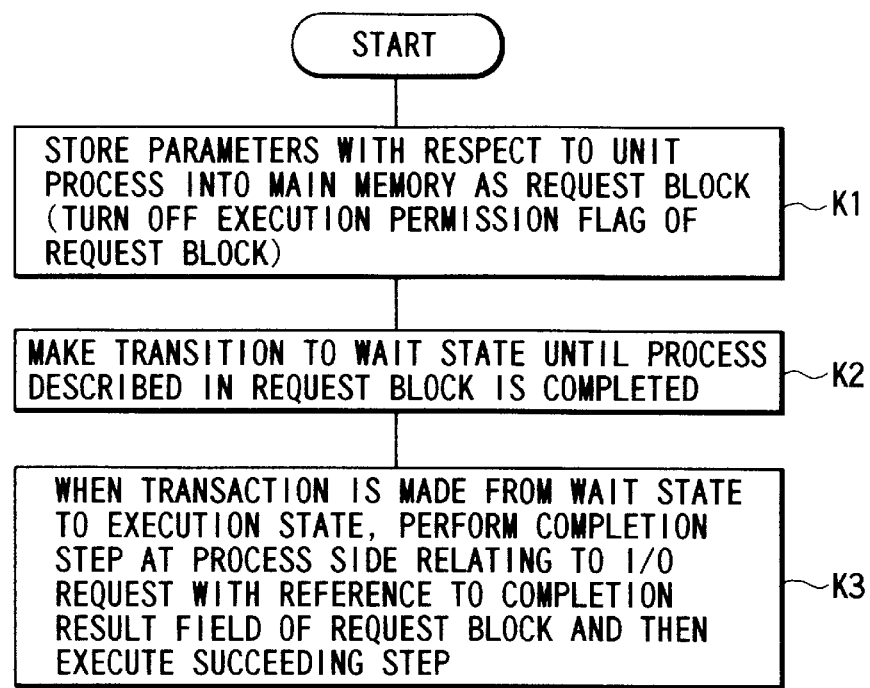
FIG. 16 is a flow diagram of an application process which makes an I/O request in the second embodiment.

FIG. 16 shows a flow diagram performed by an application process when the execution permission flag is added.

(1) Store parameters relating to an unit I/O operation into the main memory as a request block (step K1). Turn off the execution permission flag of the request block.

(2) Make transition to wait state until the I/O operation designated in the request block is completed (step K2).

(3) When the application process resumes its execution, perform a completion step at the application process side relating to the I/O request with reference to the result code field of the request block and then execute a succeeding step (step K3).

Figure 17:
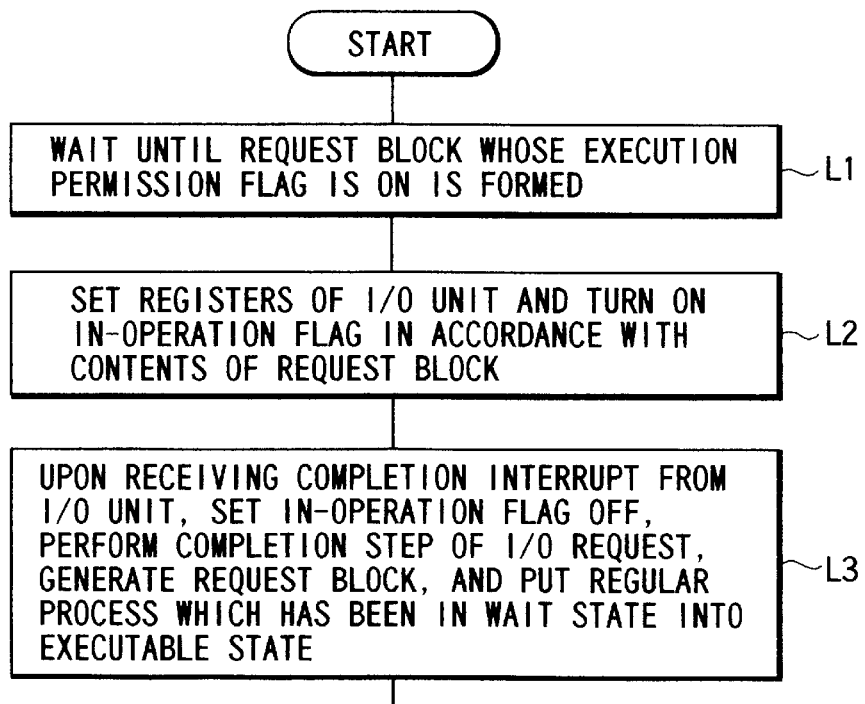
FIG. 17 is a flow diagram of an I/O execution process in the second embodiment.

FIG. 17 shows a flow diagram of an I/O execution process. In this case, it is assumed that a multiplicity of I/O execution processes are executed concurrently.

(1) Wait for a request block whose execution permission flag is ON (step L1).

(2) Set up registers of the I/O device and turn on the in-operation flag in accordance with the request block, thereby starting the I/O device (step L2).

(3) Upon receiving completion interrupt from the I/O device, turn off the in-operation flag, perform a completion step of the I/O request, write the result code in the request block, and put the application process which has been in wait state into ready state (step L3).

Figure 18:
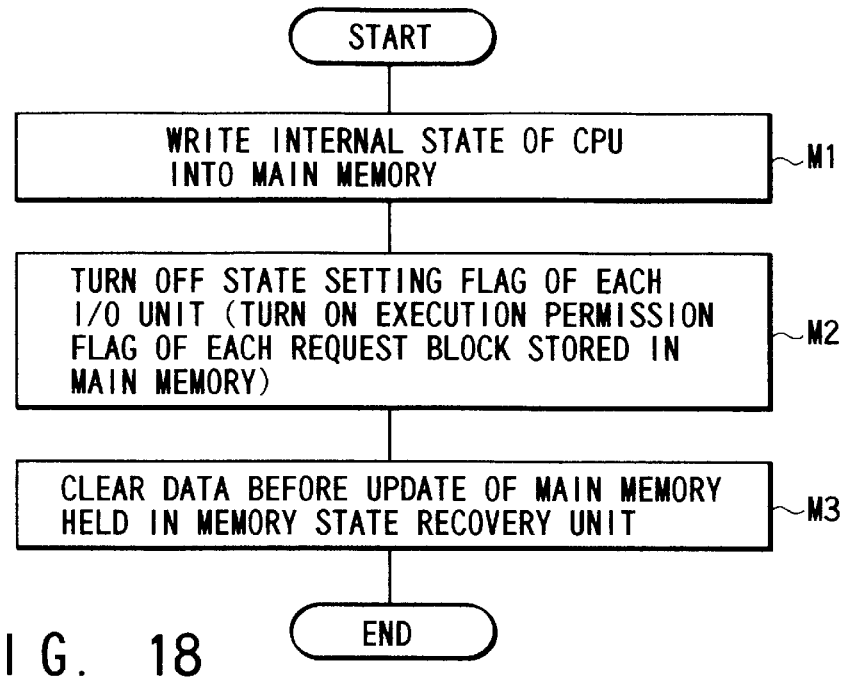
FIG. 18 is a flow diagram of a checkpoint acquisition in the second embodiment.

FIG. 18 shows a flow diagram of a checkpoint acquisition.

(1) Save the internal state of the CPU into the main memory (step M1).

(2) Turn off the state setting up flag of each I/O device (step M2). Turn on the execution permission flag of each request block stored in the main memory.

(3) Clear data held in the memory state recovery unit (step M3).

FIGS. 19A through 19E show how the I/O requests are performed. Here, two application processes, a checkpoint acquisition, and two I/O execution processes are related.

Figure 19:
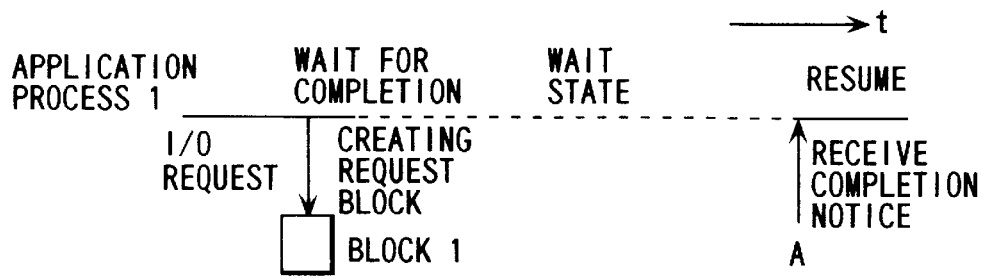
FIGS. 19A through 19E show how I/O operations are performed with delay by the application processes and the I/O execution processes in the second embodiment.
Figure 19:
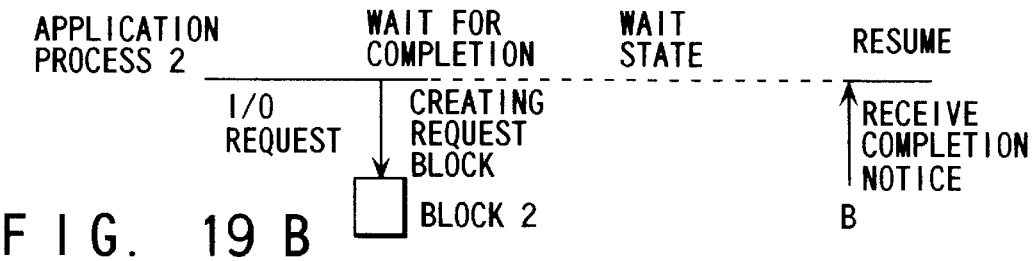
Figure 19:
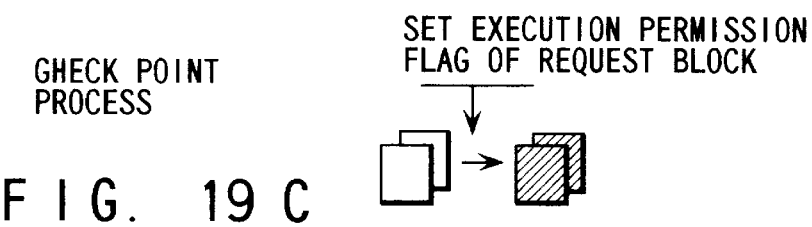
Figure 19:
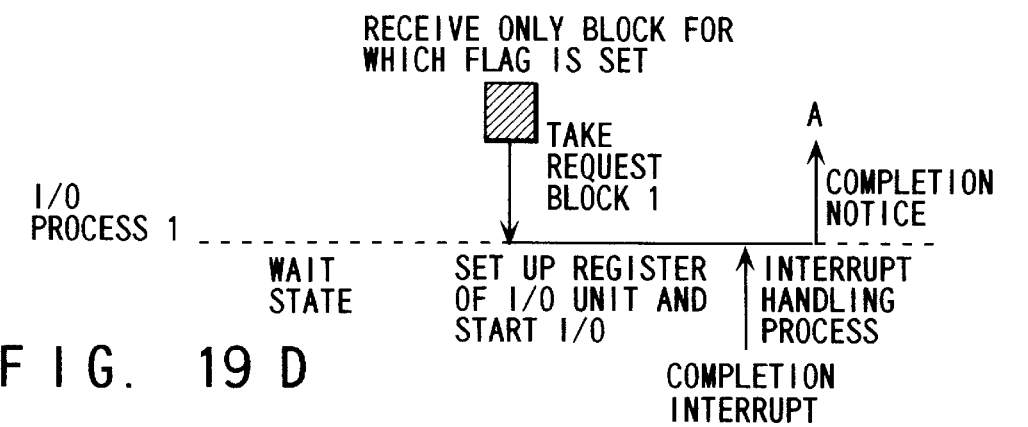
Figure 19:
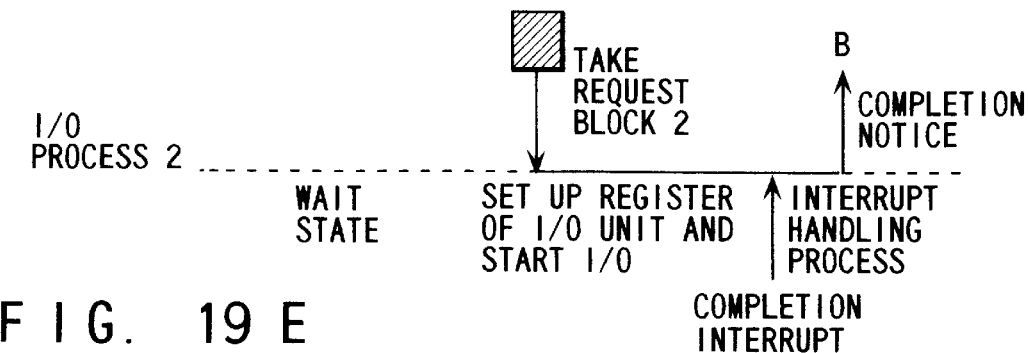

When an I/O request is made by an application process, a corresponding request block is created and stored in the memory (FIGS. 19A and 19B). Since the execution permission flag of the request block remains OFF until a checkpoint is acquired, the I/O execution process stays in idle state.

When a checkpoint has been acquired, the execution permission flag of the request block is turned on (FIG. 19C). An I/O execution process takes a request block whose execution permission flag is ON and executes the I/O operation (setting up the registers of the I/O device, starting the I/O device, and handling completion interrupt of the I/O device) (FIGS. 19D and 19E).

Figure 20:
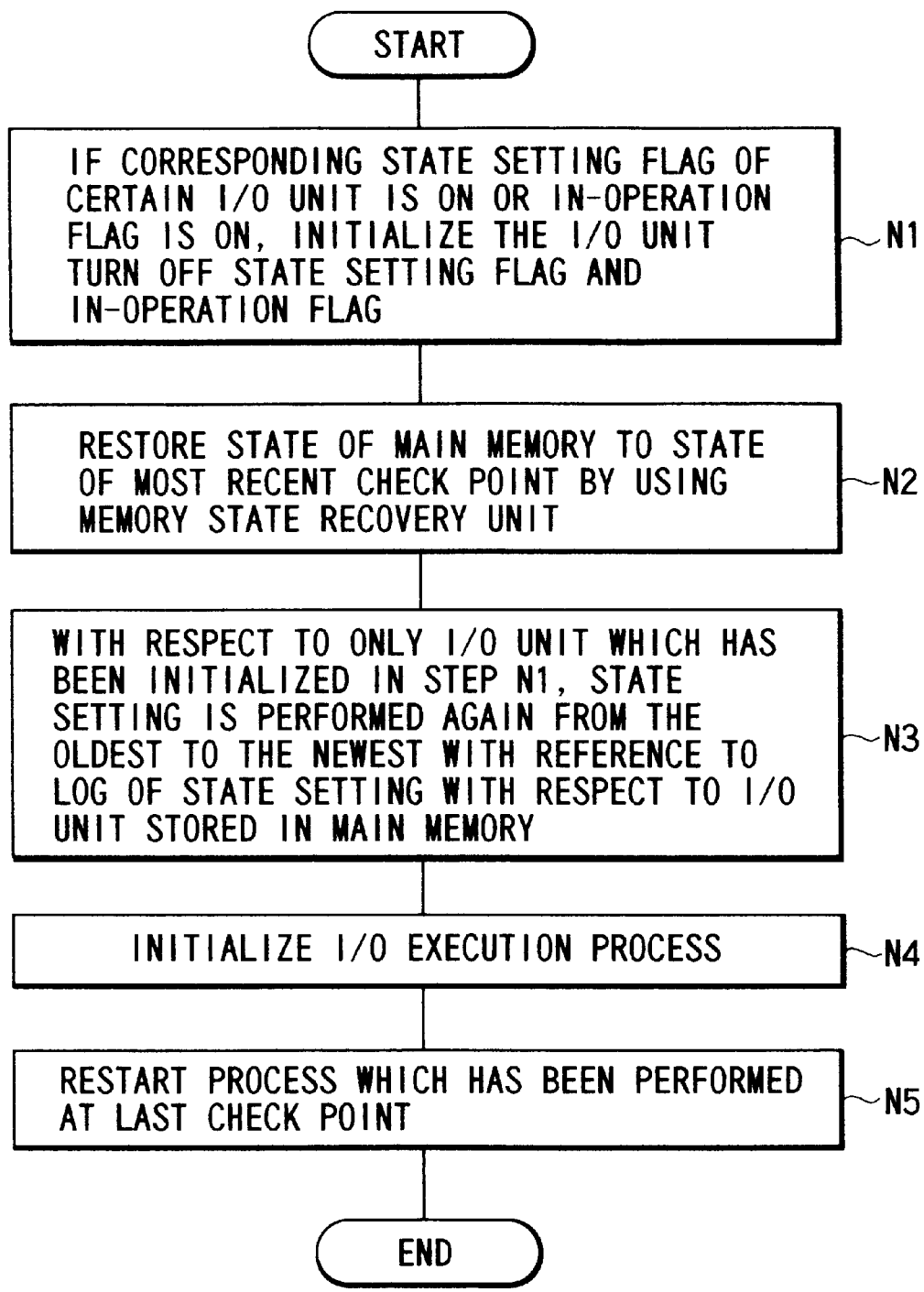
FIG. 20 is a flow diagam of a fault recovery in the second embodiment.

FIG. 20 shows a flow diagram of a fault recovery and re-execution of an I/O operation (1) If the state setting up flag of an I/O device is ON or the in-operation flag is ON, initialize the I/O device (step N1). Turn off the state setting up flag and the inoperation flag.

(2) Restore the state of the main memory to the state of the most recent checkpoint by using the memory state recovery unit (step N2).

(3) With respect to only I/O devices which have been initialized at step N1, the state setting up operation is performed again from the oldest to the newest with reference to the log of the state setting up operation stored in the main memory (step N3). The state of the I/O device is recovered to the state of the most recent checkpoint.

(4) Initialize ongoing I/O execution processes (step N4). More specifically, the I/O execution processes are set to the state of step L1 irrespective of the state of the I/O execution process at the most recent checkpoint.

(5) Restart data processing which was being performed at the most recent checkpoint (step N5).

Assume that a fault occurs in the middle of an I/O operation. When a fault occurs, the in-operation flag of the I/O device is on and therefore the I/O device is initialized. The contents of the request block is rolled back to that of the most recent checkpoint by the memory state recovery unit. Then, the state of the I/O device is recovered by reperforming the set up sequence held in the main memory.(step N3). When the fault recovery step has been completed, an I/O process takes the request block and re-executes the I/O operation according to the request block from the beginning.

This is the way that an I/O operation interrupted halfway is re-performed after a fault recovery.

When a checkpoint has been acquired, the request blocks which have been created since the preceding checkpoint become executable. Therefore, it is appropriate to set the priority of the I/O execution processes higher after a checkpoint acquisition, so that the delayed I/O requests are executed immediately.

To keep the cache hit ratio high, the CPU which executed an application process which made an I/O request should be assigned to the I/O execution process which is responsible for the request block created by the I/O request.

A preferable embodiment is as follows.

A request block has a CPU identifier field. When the request block is created, the identifier of the CPU which executes the application process is written into the CPU identifier field. An I/O execution process takes a request block having the same CPU identifier with the CPU which executes the I/O execution process.

The number of CPUs which are assigned to the I/O execution processes should be determined according to the number of the executable request blocks and the number of CPUs of the computer. If the number of the executable request blocks increases, more CPUs should be assigned to the I/O execution processes. One preferable embodiment is that the scheduler of the computer determines whether an idle state CPU is assigned to an application process or an I/O execution process depending on the number of executable request blocks.

Third Embodiment

A computer system according to this embodiment comprises, in addition to the arrangement of the computer system described in the second embodiment, a state holding area 36 (FIG. 4).

In this embodiment, attention is focused on an I/O device such as a printer. For a printer, when a fault occurs in the computer while a slip is being printed, the slip may be left in an incomplete state (i.e., the printer cannot be restored to the state of the most recent checkpoint or finish printing the slip completely.)

In order to detect such a state, an execution interruption error flag is added to a request block in this embodiment. This execution interruption error flag is used to identify whether the I/O operation designated by a request block results in an unrecoverable I/O error by a fault occurrence in the computer system.

Figure 21:
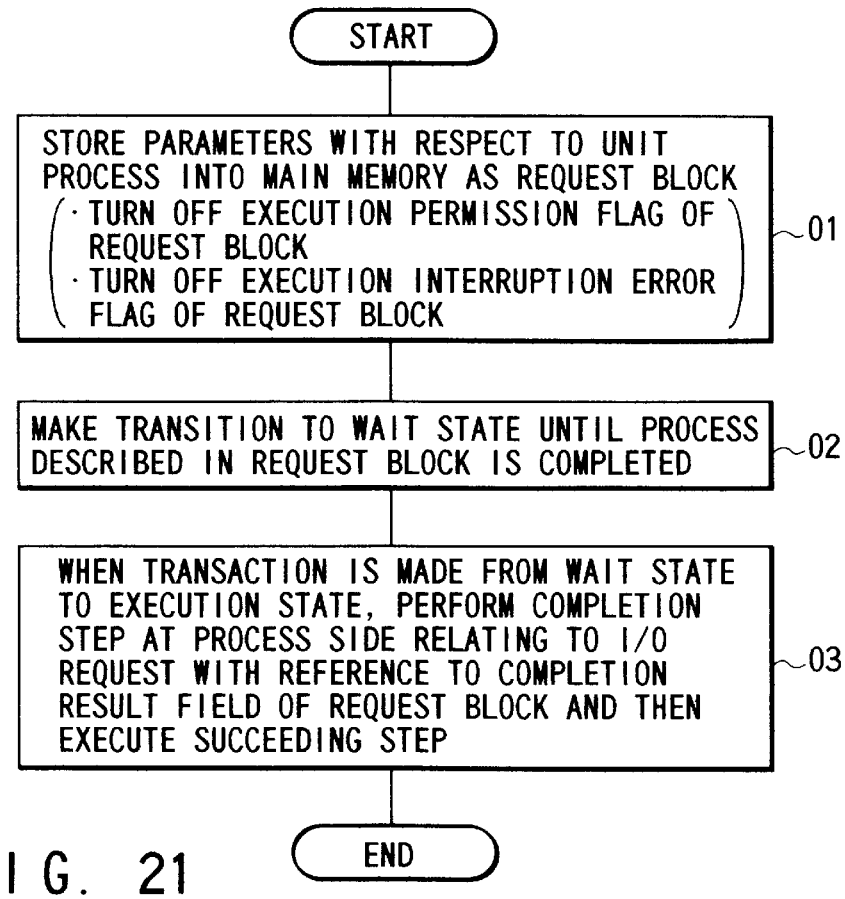
FIG. 21 is a flow diagram of an application process which makes an I/O request in the third embodiment of the present invention.

FIG. 21 shows a flow diagram performed by an application process in this embodiment.

(1) Store parameters relating to an I/O operation in the main memory as a request block (step O1). Turn off an execution permission flag of the request block, and turn off the execution interruption error flag of the request block.

(2) Make transition to wait state until the I/O operation designated in the request block is completed (step O2).

(3) When the application process resumes its execution, perform a completion step at the application process side relating to the I/O request with reference to the result code field of the request block and then execute a succeeding step (step O3).

FIG. 22 shows a flow diagram of an I/O execution process.

(1) Wait for a request block whose execution permission flag is ON (step P1).

(2) If the execution interruption error flag of the request block is ON, set an error code in the result code field of the request block, and set the application process which has been in wait state to ready state (steps P2, P5).

(3) Otherwise, set up registers of an I/O device and turn on the in-operation flag in accordance with the request block (step P3). Turn on the execution interruption error flag of the request block if the I/O device is a printer.

(4) Upon receiving completion interrupt from the I/O device, turn off the in-operation flag, perform a completion step of the I/O request, write result code in the request block, and put the application process which has been in wait state into ready state (step P4). Turn off the execution interruption error flag of the request block if the I/O device is a printer.

Figure 23:
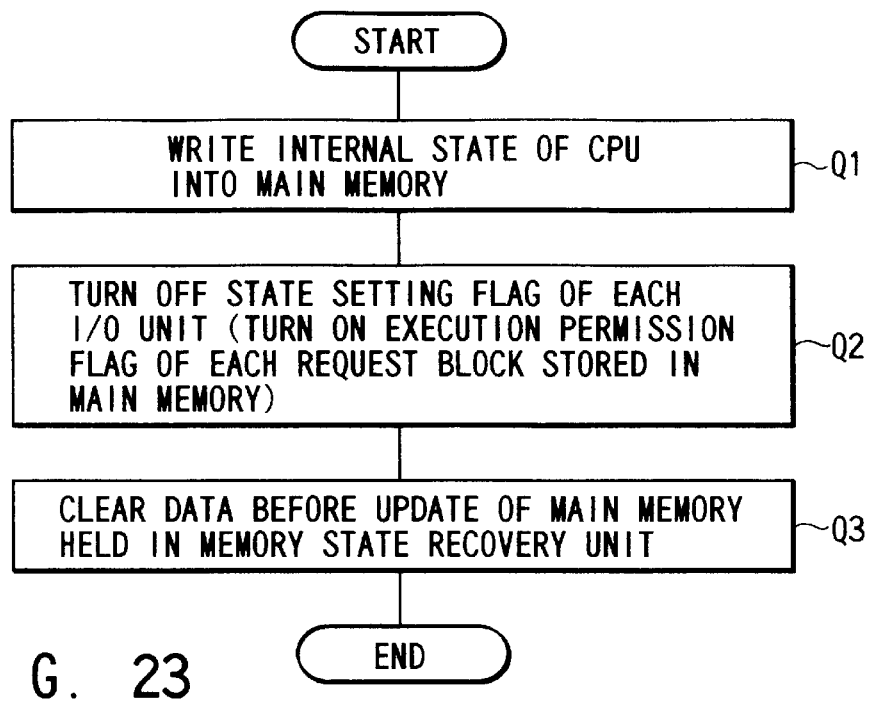
FIG. 23 is a flow diagram of a checkpoint acquisition in the third embodiment.

FIG. 23 shows a flow diagram of a checkpoint acquisition in this embodiment.

(1) Save the internal state of the CPU into the main memory (step Q1).

(2) Turn off the state setting up flag of each I/O device (step Q2). Turn on the execution permission flag of each request block stored in the main memory.

(3) Clear data held in the memory state recovery unit (step Q3).

Figure 24:
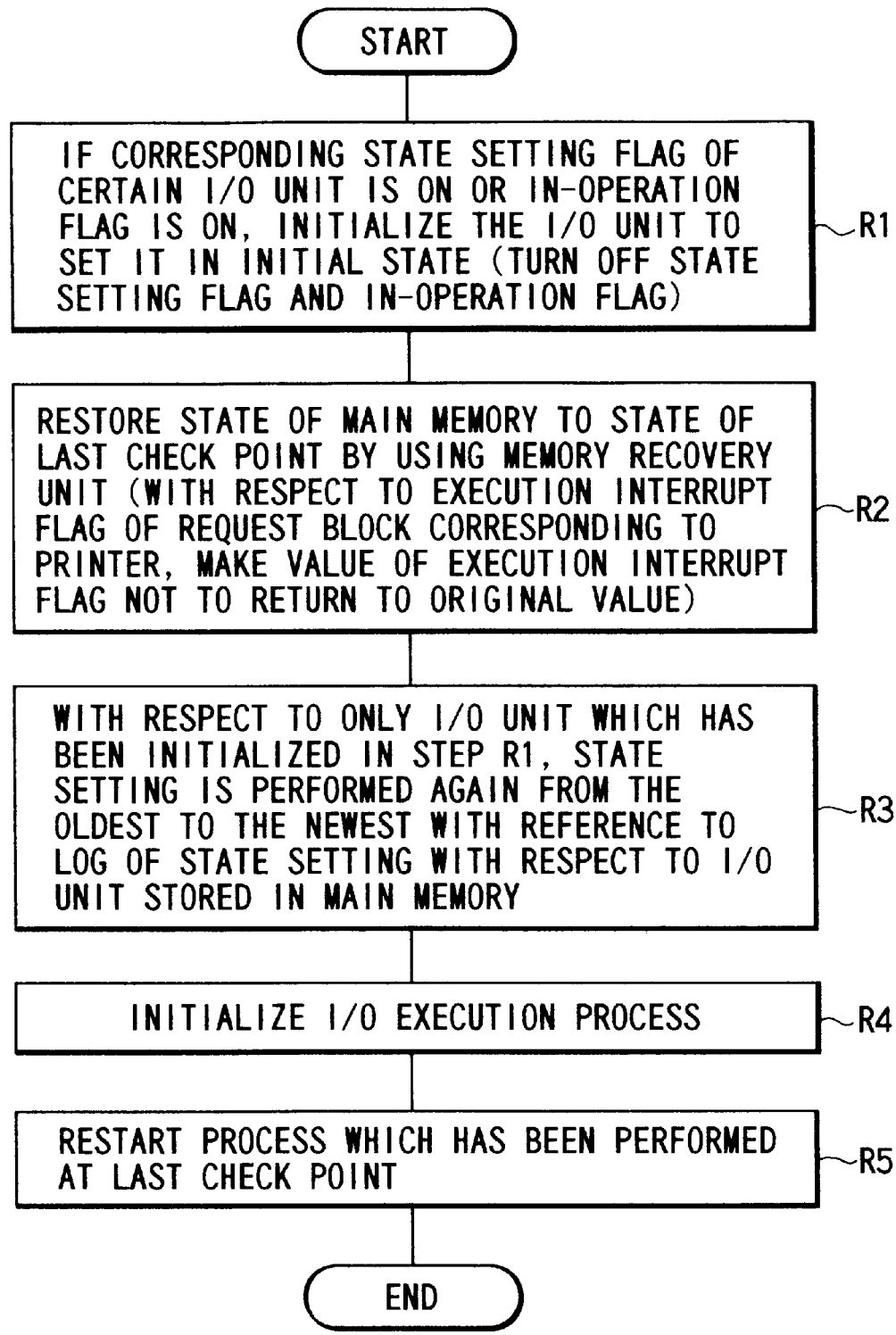
FIG. 24 is a flow diagram of a fault recovery in the third embodiment.

FIG. 24 shows a flow diagram of a fault recovery upon occurrence of a fault in this embodiment.

(1) If the state setting up flag of an I/O device is ON or the in-operation flag is ON, initialize the I/O device (step R1). Turn off the state setting up flag and the in-operation flag (step R1).

(2) Restore the state of the main memory to the state of the most recent checkpoint by using the memory state recovery unit.

With respect to the execution interruption error flag of the request block corresponding to a printer, the value of the flag must be unchanged through the restoring of the main memory. This operation is realized, for instance, in the following way. An ordinary computer system has an NVRAM (nonvolatile memory) for holding system parameters, and data update in the NVRAM can be controlled such that the state is not restored by the main memory recovery unit. Therefore, when a fault occurs, the system saves the value of the execution interruption error flag in the NVRAM before the main memory restoration, and writes back the saved value into the flag after the main memory restoration (step R2).

(3) With respect to only an I/O device which has been initialized at step R1, the state set up sequence is re-performed from the oldest to the newest with reference to the log of the state setting up operation held in the main memory (step R3). In this manner, the state of the I/O device is recovered to the state of the most recent checkpoint.

(4) Initialize ongoing I/O execution processes (step R4). More specifically, the I/O execution processes are set to the state of step P1 irrespective of the state of the I/O execution process at the most recent checkpoint.

(5) Restart data processing which was being performed at the most recent checkpoint (step R5).

When a fault occurs in the middle of a printer I/O operation according to a request block, the execution interruption error flag is ON and it remains unchanged through the main memory restoration. Then an I/O execution process tries to re-execute the request block and it finds the execution interruption error flag is ON (at step P2). The I/O execution process, instead of re-executing the I/O operation, sets an error code in the result code field of the request block, and sets the application process into ready state.

In this manner, when a printer I/O operation is interrupted halfway because of a fault occurrence, the printer I/O operation is not repeated again, but the application process copes with the error like a printer jam error.

In case of a printer, it is more suitable to have the execution interruption error flag as a ternary flag, i.e., completion/in-execution/non-execution.

Figure 25:
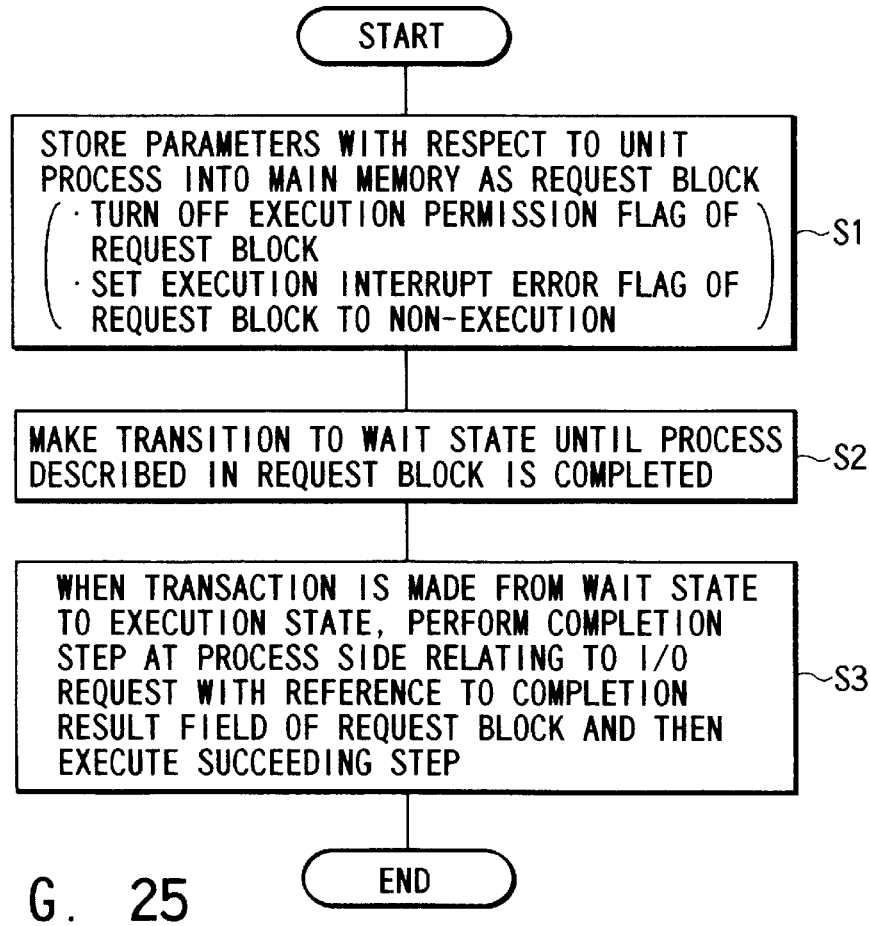
FIG. 25 is a flow diagram of an application process which makes an I/O request in the third embodiment.

FIG. 25 shows a flow diagram performed by an application process in this case.

(1) Store parameters with respect to an I/O operation into the main memory as a request block (step S1). Turn off the execution permission flag of the request block, and set the execution interruption error flag of the request block to non-execution.

(2) Make transition to wait state until the I/O operation described in the request block is completed (step S2).

(3) When the application process resumes its execution, perform a completion step at the application process side relating to the I/O request with reference to the result code field of the request block and then execute a succeeding step (step S3).

FIG. 26 shows a flow diagram of an I/O execution process.

(1) Wait for a request block whose execution permission flag is ON (step T1).

(2) If the execution interruption error flag of the request block is set at in-execution, set an error code in the result code field of the request block, and set the application process which has been in wait state to a ready state (steps T2, T6).

(3) Otherwise, if the execution interruption error flag is set at completion, set a completion code in the result code field of the request block, and set the application process which has been in wait state to a ready state (steps T3, T7)

(4) Otherwise, set up registers of an I/O device and turn on the in-operation flag in accordance with the request block (step T4).

(5) Upon receiving completion interrupt from the I/O device, turn off the in-operation flag, set the execution interruption error flag to completion, and set the application process which has been in wait state to ready state (step T5)

When a fault occurs after the end of a printer I/O operation, the execution interruption error flag is set at completion and it remains unchanged through the main memory restoration. Then an I/O execution process tries to reexecute the request block and it finds the execution interruption error flag shows completion (at step T3). The I/O execution process, instead of re-executing the I/O operation, sets a termination code in the result code field of the request block, and sets the application process into a ready state.

In this manner, when a printer I/O operation has been completed before the occurrence of a fault in the computer, the printer I/O operation i s not repeated again, but the application process receives a result code.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

We claim:

1. An I/O control apparatus in a computer system which has one or more CPUs, a main memory, and one or more I/O devices and in which said CPUs periodically save the internal state of said CPUs and the contents of said main memory as a checkpoint, and the internal status of said CPUs and the contents of said main memory of a most recent checkpoint are restored when a fault occurs in said computer system to restart data processing comprising:

I/O device state storing means for logging parameters of a state setup sequence of said I/O devices performed by said CPUs, said I/O device state storing means including means for erasing part of previously logged parameters of an I/O device which is made unnecessary when a new state of said I/O device is set; and I/O device state restoring means for restoring the state of said I/O devices to that of the most recent checkpoint by first initializing said I/O devices and by second reexecuting the state setup sequence according to said logged parameters stored by said I/O device state storing means.

2. An apparatus according to claim 1, further comprising:

request block creating means for creating, when an application process in said computer system makes an I/O request, a request block in said main memory which contains information necessary to perform said I/O request;

I/O execution processes for performing an I/O operation by executing I/O device driver routines according to a request block; and I/O execution process initializing means for initializing, upon restart from the most recent checkpoint after a fault occurrence, said I/O execution processes other than in initial state and causing I/O operations being performed by said I/O execution processes to be performed again from the beginning.

3. An apparatus according to claim 2, wherein, of request blocks held in said main memory, said I/O execution processes begin to perform an I/O operation according to a request block created before the most recent checkpoint, while said I/O execution processes postpone an I/O operation according to a request block created after the most recent checkpoint until a new checkpoint acquisition.

4. An apparatus according to claim 2, wherein the CPU which executes an application process which made an I/O request also executes an I/O execution process which is responsible for the request block created based on said I/O request.

5. An apparatus according to claim 2, wherein the number of CPUs which are assigned to said I/O execution processes is properly determined depending on the number of request blocks to be processed.

6. An apparatus according to claim 2, further comprising means for making, when a fault occurs, an error reply to the application process without reexecuting the requested I/O operation, in case that said I/O device state restoring means does not manage to restore the state of the I/O device which relates to said I/O request.

7. An apparatus according to claim 2, further comprising means for reporting, when a fault occurs, a successful I/O completion to the application process without re-executing the requested I/O operation, in a case that the I/O request is an output request and the I/O request has been completed before the fault occurrence.

8. An apparatus according to claim 3, wherein said CPUs are assigned to said I/O execution processes when a new checkpoint acquisition has been completed.

9. An apparatus according to claim 3, further comprising means for making, when a fault occurs, an error reply to the application process without reexecuting the requested I/O operation, in case that said I/O device state restoring means does not manage to restore the state of the I/O device which relates to said I/O request.

10. An apparatus according to claim 3, further comprising means for reporting, when a fault of said computer system occurs, a successful I/O completion to the I/O requesting process without re-executing the requested I/O operation, in a case that the I/O request was an output request and the I/O request has been completed before the fault occurrence.

11. An I/O control apparatus in a computer system which has one or more CPUs, a main memory, and one or more I/O devices and in which said CPUs periodically save the internal state of said CPUs and the contents of said main memory as a checkpoint, and the internal state of said CPUs and the contents of said main memory of a most recent checkpoint are restored when a fault occurs in said computer system to restart data processing, comprising:

I/O device state storing means for logging parameters of a state setup sequence of said I/O devices performed by said CPUs; and I/O device state restoring means for restoring the state of said I/O devices to that of the most recent checkpoint by first initializing said I/O devices and by second reexecuting the state setup sequence according to said logged parameters stored by said I/O device state storing means, said I/O device state restoring means including means for skipping initializing and reexecuting the state setup sequence of an I/O device in which a new state setup sequence has not been performed since the most recent checkpoint.

12. An apparatus according to claim 11, further comprising:

request block creating means for creating, when an application process in said computer system makes an I/O request, a request block in said main memory which contains information necessary to perform said I/O request;

I/O execution processes for performing an I/O operation by executing I/O device driver routines according to a request block; and I/O execution processes initializing means for initializing, upon restart from the most recent checkpoint after a fault occurrence, said I/O execution processes other than in initial state and causing I/O operations being performed by said I/O execution processes to be performed again from the beginning.

13. An apparatus according to claim 12, wherein, of request blocks held in said main memory, said I/O execution processes begin to perform an I/O operation according to a request block created before the most recent checkpoint, while said I/O execution processes postpone an I/O operation according to a request block created after the most recent checkpoint until a new checkpoint acquisition.

14. An apparatus according to claim 12, wherein the CPU which executes an application process which made an I/O request also executes an I/O execution process which is responsible for the request block created based on said I/O request.

15. An apparatus according to claim 12, wherein the number of CPUs which are assigned to said I/O execution processes is properly determined depending on the number of request blocks to be processed.

16. An apparatus according to claim 12, further comprising means for making, when a fault occurs, an error reply to the application process without reexecuting the requested I/O operation, in case that said I/O device state restoring means does not manage to restore the state of the I/O device which relates to said I/O request.

17. An apparatus according to claim 12, further comprising means for reporting, when a fault occurs, a successful I/O completion to the application process without re-executing the requested I/O operation, in a case that the I/O request is an output request and the I/O request has been completed before the fault occurrence.

18. An apparatus according to claim 13, wherein said CPUs assigned to said I/O execution processes when a new checkpoint acquisition has been completed.

19. An apparatus according to claim 13, further comprising means for making, when a fault occurs, an error reply to the application process without reexecuting the requested I/O operation, in case that said I/O device state restoring means does not manage to restore the state of the I/O device which relates to said I/O request.

20. An apparatus according to claim 13, further comprising means for reporting, when a fault occurs, a successful I/O completion to the application process without re-executing the requested I/O operation, in a case that the I/O request is an output request and the I/O request has been completed before the fault occurrence.

21. An I/O control apparatus in a computer system which has one or more CPUs, a main memory, and one or more I/O devices and in which said CPUs periodically save the internal state of said CPUs and the contents of said main memory as a checkpoint, and the internal state of said CPUs and the contents of said main memory of a most recent checkpoint are restored when a fault occurs in said computer system to restart data processing, comprising:
    I/O device state storing means for logging parameters of a state setup sequence of said I/O devices performed by said CPUs;
    I/O device state restoring means for restoring the state of said I/O devices to that of the most recent checkpoint by first initializing said 10 devices and by second reexecuting the state setup sequence according to said logged parameters stored by said I/O device state storing means;
    request block creating means for creating, when an application process in said computer system makes an I/O request, a request block in said main memory which contains information necessary to perform said I/O request;
    I/O execution processes for performing an I/O operation by executing I/O device driver routines according to a request block; and
    I/O execution processes initializing means for initializing, upon restart from the most recent checkpoint after a fault occurrence, said I/O execution processes other than in initial state and causing I/O operations being performed by said I/O execution processes to be reexecuted from the beginning.

22. An apparatus according to claim 21, wherein., of request blocks held in said main memory, said I/O execution processes begin to perform an I/O operation according to a request block created before the most recent checkpoint, while said I/O execution processes postpone an I/O operation according to a request block created after the most recent checkpoint until a new checkpoint acquisition.

23. An apparatus according to claim 21, wherein the CPU which executes an application process which made an I/O request also executes an I/O execution process which is responsible for the request block created based on said I/O request.

24. An apparatus according to claim 21, wherein the number of CPUs which are assigned to said I/O execution processes is properly determined depending on the number of request blocks to be processed.

25. An apparatus according to claim 21, further comprising means for making, when a fault occurs, an error reply to the application process without reexecuting the requested I/O operation, in a case that said I/O device state restoring means fails to restore the state of the I/O device which relates to said I/O request.

26. An apparatus according to claim 21, further comprising means for reporting, when a fault occurs, a successful I/O completion to the application process without re-executing the requested I/O operation, in a case that the I/O request is an output request and the I/O request has been completed before the fault occurrence.

27. An apparatus according to claim 22, wherein said CPUs are assigned to said I/O execution processes when a new checkpoint acquisition has been completed.

28. An apparatus according to claim 22, further comprising means for making, when a fault occurs, an error reply to the application process without reexecuting the requested I/O operation, in case that said I/O device state restoring means does not manage to restore the state of the I/O device which relates to said I/O request.

29. An apparatus according to claim 22, further comprising means for reporting, when a fault occurs, a successful I/O completion to the application process without re-executing the requested I/O operation, in a case that the I/O request is an output request and the I/O request has been completed before the fault occurrence.

30. An I/O control method in a computer system which has one or more CPUs, a main memory, and one or more I/O devices and in which said CPUs periodically save the internal state of said CPUs and the contents of said main memory as a checkpoint, and the internal state of said CPUs and the contents of said main memory of the most recent checkpoint are restored when a fault occurs in said computer system to restart data processing, comprising the steps of:
    logging parameters of a state setup sequence of said I/O devices performed by said CPUs, said logging step including erasing part of previously logged parameters of an I/O device which is made unnecessary when a new state of said I/O device is set; and
    restoring the state of said I/O devices to that of the most recent checkpoint by first initializing said I/O devices and by second reexecuting the state setup sequence according to said logged parameters.

31. An I/O control method in a computer system which has one or more CPUs, a main memory, and one or more I/O devices and in which said CPUs periodically save the internal state of said CPUs and the contents of said main memory as a checkpoint, and the internal state of said CPUs and the contents of said main memory of a most recent checkpoint are restored when a fault occurs in said computer system to restart data processing, comprising the steps of:
    logging parameters of a state setup sequence of said I/O devices performed by said CPUs; and restoring the state of said I/O devices to that of the most recent checkpoint by first initializing said I/O devices and by second reexecuting the state setup sequence according to said logged parameters, said restoring step including initializing and reexecuting the state setup sequence of an I/O device in which a new state setup sequence has been performed since the most recent checkpoint.

32. An I/O control method in a computer system which has one or more CPUs, a main memory, and one or more I/O devices and in which said CPUs periodically save the internal state of said CPUs and the contents of said main memory as a checkpoint, and the internal state of said CPUs and the contents of said main memory of a most recent checkpoint are restored when a fault occurs in said computer system to restart data processing, comprising the steps of:

logging parameters of a state setup sequence of said I/O devices performed by said CPUs;

restoring the state of said I/O devices to that of the most recent checkpoint by first initializing said I/O devices and by second reexecuting the state setup sequence according to said stored logged parameters;

creating, when an application process in said computer system makes an I/O request, a request block in said main memory which contains information necessary to perform said I/O request;

performing I/O operations, using I/O execution processes, by executing I/O device driver routines according to a request block; and initializing, upon restart from the most recent checkpoint after a fault occurrence, said I/O execution processes other than in initial state and causing I/O operations being performed by said I/O execution processes to be reexecuted from the beginning.

* * * * *

UNITED STATES PATENT AND TRADEMARK OFFICE
CERTIFICATE OF CORRECTION

PATENT NO. : 5,931,954
DATED : August 3, 1999
INVENTOR(S) : Satoshi HOSHINA et al.

It is certified that error appears in the above-indentified patent and that said Letters Patent is hereby corrected as shown below:

Claim 1, Col. 15, line 17, after "processing", insert --,--.

Claim 18, Col. 17, line 20, after "CPUs", insert --are-.

Claim 21, Col. 17, line 48, "10 devices" should read --I/O devices--.

Claim 22, Col. 17, line 66, "wherein.," should read --wherein,--.

Signed and Sealed this

Twenty-seventh Day of March, 2001

Attest:

NICHOLAS P. GODICI

Attesting Officer

Acting Director of the United States Patent and Trademark Office